US012651507B2

(12) United States Patent
Rodriguez et al.

(10) Patent No.: US 12,651,507 B2
(45) Date of Patent: Jun. 9, 2026

(54) LEVER APPARATUS WITH A DISPLAY MODULE FOR SUPPLEMENTING A MAIN DISPLAY OF A GAMING MACHINE

(71) Applicant: Aristocrat Technologies, Inc., Las Vegas, NV (US)

(72) Inventors: Frank Rodriguez, Las Vegas, NV (US); Shanon Nishimura, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 245 days.

(21) Appl. No.: 18/523,083

(22) Filed: Nov. 29, 2023

(65) Prior Publication Data

US 2025/0174074 A1 May 29, 2025

(51) Int. Cl.
*G07F 17/00* (2006.01)
*G07F 17/32* (2006.01)

(52) U.S. Cl.
CPC ...... *G07F 17/3213* (2013.01); *G07F 17/3209* (2013.01)

(58) Field of Classification Search
None
See application file for complete search history.

(56) References Cited

U.S. PATENT DOCUMENTS

| | | | | |
|---|---|---|---|---|
| 4,524,636 A | | 6/1985 | Nishikawa | |
| 4,600,197 A | * | 7/1986 | Bean | G07F 17/34 273/143 R |
| 4,802,380 A | * | 2/1989 | Shirasawa | G07F 17/34 192/48.92 |
| 5,303,919 A | * | 4/1994 | Takemoto | G07F 17/32 273/143 R |
| 5,342,049 A | * | 8/1994 | Wichinsky | G07F 17/3244 273/121 A |
| 5,472,197 A | * | 12/1995 | Gwiasda | G07F 17/323 273/143 R |
| 7,611,406 B2 | * | 11/2009 | Fuller | G07F 17/3267 463/16 |
| 8,628,416 B2 | * | 1/2014 | Scott | G07F 17/3206 463/16 |
| 9,370,716 B2 | | 6/2016 | Munakata | |
| 10,096,200 B2 | | 10/2018 | Ditton | |
| 11,380,160 B1 | * | 7/2022 | Letovsky | G07F 17/3239 |

(Continued)

*Primary Examiner* — Paul A D'Agostino
(74) *Attorney, Agent, or Firm* — Weaver Austin Villeneuve & Sampson LLP

(57) ABSTRACT

An EGM includes a cabinet having a main display. The main display has a transverse plane and is configured to present a set of reels each having a plurality of symbols. The EGM further includes a lever apparatus having an arm mounted to the cabinet and configured to move between a first position and a second position. The lever apparatus further has a display module including a supplemental display having a center. Responsive to the supplemental display being supported by the arm in the first position, the supplemental display is located relative to the main display such that the center of the supplemental display is spaced up to one inch from the transverse plane of the main display. Responsive to the arm being moved from the first position to the second position, the supplemental display presents one or more symbols along a first payline continued from the main display.

19 Claims, 13 Drawing Sheets

(56) References Cited

U.S. PATENT DOCUMENTS

| | | | | |
|---|---|---|---|---|
| 2004/0259627 | A1* | 12/2004 | Walker | G07F 17/34 463/20 |
| 2006/0160613 | A1* | 7/2006 | Hornik | G07F 17/3262 463/25 |
| 2006/0211497 | A1* | 9/2006 | Manz | G07F 17/32 463/37 |
| 2007/0105610 | A1* | 5/2007 | Anderson | G07F 17/32 463/16 |
| 2010/0109238 | A1* | 5/2010 | Kromydas | G07F 17/3213 273/142 H |
| 2012/0309490 | A1* | 12/2012 | Okada | G07F 17/3244 463/20 |
| 2014/0141880 | A1* | 5/2014 | Munakata | G07F 17/34 463/31 |
| 2014/0342796 | A1* | 11/2014 | Fujisawa | G07F 17/3213 463/20 |
| 2014/0342797 | A1* | 11/2014 | Fujisawa | G07F 17/3213 463/20 |
| 2018/0357854 | A1 | 12/2018 | Schrementi | |
| 2020/0388115 | A1* | 12/2020 | Lee | G07F 17/34 |
| 2021/0319671 | A1 | 10/2021 | Amaitis | |
| 2021/0375097 | A1* | 12/2021 | Coppola | G07F 17/3213 |
| 2022/0335775 | A1* | 10/2022 | Maddux | G07F 17/34 |

* cited by examiner

LEVER APPARATUS WITH A DISPLAY MODULE FOR SUPPLEMENTING A MAIN DISPLAY OF A GAMING MACHINE

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some games of chance, e.g., slot-type games, there may be certain symbols that, when displayed (or when at least a certain number of them are displayed) as part of a game outcome cause awards specific to each such symbol to be awarded to the player. Such symbols are typically referred to as "cash-on-reel" symbols.

SUMMARY

Early gaming machines were purely mechanical systems in which physical reels were caused to spin in response to a player pulling a lever. Prizes were awarded based on what symbols were displayed when the reels stopped. Later development led to the introduction of electronic gaming machines (EGMs) that still included physical reels but which drove their movement through the use of stepper motors; the stepper motors were controlled by a processor or processors according to output of a random number generator. Most modern EGMs have replaced the physical reels with virtual representations of such reels, e.g., digital reels, that are caused to be displayed on one or more display screens of such EGMs.

Generally speaking, EGMs with digital reels are preferred by many EGM operators across the industry for a variety of reasons. For example, if it is desired to change out the reel sets on an EGM with digital reels, this can be done through a software update delivered via network-requiring no human intervention at the EGM. In contrast, changing out the reel set on an EGM with mechanical reels requires an actual exchange of physical hardware, requiring that a technician go to the EGM, take it out of service, open it, swap out the reel set, and then close it and put it back into service. Another benefit to digital reels is that they can be of any size (in terms of the numbers of symbols that can be on the reel), which allows for more flexibility in terms of the number of game outcomes that can be provided. Digital reels can also be exchanged on the fly, e.g., one set of digital reels may be used for a base game, while a second, different set of digital reels may be switched to for a bonus game that may be triggered by an outcome in the base game. However, despite such benefits, EGMs with mechanical reels continue to be offered by manufacturers and are popular with a significant segment of slot-machine players. For example, such players may prefer mechanical-reel EGMs over digital-reel EGMs due to a perceived distrust of games with digital reels (on the reasoning that it would be easier for a player to detect if a mechanical reel were being manipulated so as to stop at a particular outcome) or discomfort with digital devices.

The present inventors conceived of a mechanical lever (e.g., slot pull-handle) with a display (e.g., a digital display, a split-flap display, etc.) that may be positioned so as to align with reels (e.g., curved mechanical reels) within a main cabinet in a manner that causes the display on the mechanical lever to appear to be an "extra" reel that is outside of the main cabinet and can be used to enhance or expand game play occurring on the main display, thereby allowing the reel set shown in the main display to be "expanded" by an extra reel that is located in the lever. In the present disclosure, a gaming machine (e.g., an EGM, mechanical reel game, etc.) may include a cabinet containing a main display and a lever apparatus mounted to the cabinet, with the lever apparatus including a display module using a supplemental display to present graphical objects and/or data supplementing those presented by the main display on the cabinet. In one implementation, the lever apparatus may further include an arm mounted to the cabinet and configured to initiate game play responsive to movement of the arm, with the display module removably coupled to the arm. The lever apparatus may further include a handle removably coupled to the display module and configured to be operated by a player to move the arm. When the display module requires maintenance, repair, or replacement, the display module can be removed from the lever apparatus, and the handle may be removably coupled directly to the arm thus minimizing downtime of the gaming machine.

The main display may have one or more main display parameters (e.g., a location of the main display along a vertical direction, a location of the main display along a horizontal direction, a size of the main display, a shape of the main display, etc.); the supplemental display may have one or more supplemental display parameters (e.g., a location of the supplemental display along a vertical direction, a location of the supplemental display along a horizontal direction, a size of the supplemental display, a shape of the supplemental display, etc.); the cabinet may have one or more cabinet parameters (e.g., a location of a curved edge of the cabinet along a vertical direction, a location of the curved edge along a horizontal direction, a size of the curved edge, a shape of the curved edge, etc.). One or more of the supplemental display parameters may be within a predetermined range of a corresponding one of the main display parameters and/or the cabinet parameters (e.g., to accurately align one or more paylines presented by of the main display with one or more symbols displayed on the supplemental display, direct a player's attention to graphical objects and/or data collectively presented by a combination of the main display and the supplemental display, attract late adopters to machines having one or more electronic components, provide aesthetic continuity across the gaming and/or a bank of multiple gaming machines, etc.). In implementations where the supplemental display may be an electronic display screen, the electronic display screen may present graphical objects representing symbols on a floating virtual reel and positioned on one or more paylines continued from the main display, thus providing additional game play options. Furthermore, in implementations where the main display in the cabinet may include mechanical reels and the supplemental display in the lever apparatus may be an electronic display screen (e.g., a high-resolution LCD panel, a plasma display panel, a LED panel, an OLED panel, AMOLED panel, a capacitive touchscreen, etc.), the combination of mechanical reels and the electronic display screen may attract players who may normally have a preference for mechanical EGMs, thereby potentially exposing them to a hybrid game featuring both mechanical and digital aspects. Positive experiences on such hybrid devices may make such players potentially more accepting of purely digital EGMs as well.

An electronic gaming machine (EGM) may include a cabinet having a main display configured to present a set of reels each having a plurality of symbols. The main display may include a first half portion and a second half portion disposed on opposing sides of a transverse plane. The EGM may further include a lever apparatus having an arm mounted to the cabinet and configured to move between a first position and a second position. The lever apparatus may further have a display module including a housing removably coupled to the arm. The display module may further include a supplemental display removably coupled to the housing and having a center. The supplemental display may be located, responsive to the supplemental display being supported by the arm in the first position, relative to the main display such that the center of the supplemental display is spaced up to one inch from the transverse plane of the main display. The EGM may further include one or more processors and one or more memory devices. The one or more memory devices may store computer-executable instructions which, when executed by the one or more processors, cause the one or more processors to cause, responsive to the arm being moved from the first position to the second position: the main display to present the set of reels with a combination of the symbols along a first payline of a first set of one or more paylines, and the supplemental display to present one or more symbols along the first payline of the first set of one or more paylines continued from the main display.

In some implementations, the set of reels each may have a cylindrical surface with a first radius of curvature about a first center axis. Each of the reels may be configured to rotate about the first center axis. The supplemental display may include an electronic display screen having a convex surface with a second radius of curvature about a second center axis. The supplemental display may be located, responsive to the supplemental display being supported by the arm in the first position, relative to the main display such that the second center axis corresponding with the convex surface of the supplemental display may be positioned up to one inch from the first center axis of the cylindrical surface of the reels for the main display.

In some implementations, a ratio of the second radius of curvature for the convex surface of the supplemental display to the first radius of curvature for the cylindrical surface of each of the reels may be within a range between 1:1 and 1.5:1.

In some implementations, the cabinet may have a pair of curved edges on opposite sides of the main display, and each of the curved edges may have a third radius of curvature about a third center axis. The supplemental display may be located, responsive to the supplemental display being supported by the arm in the first position, relative to the pair of curved edges such that the center of the supplemental display may be positioned up to one inch along a vertical direction from the third center axis corresponding with the curved edges of the cabinet.

In some implementations, a ratio of the third radius of curvature for the curved edges to the second radius of curvature for the convex surface of the supplemental display may be within a range between 1:1 and 1.5:1.

In some implementations, the set of reels, the supplemental display of the lever apparatus, and the curved edges of the cabinet may be positioned relative to one another, when the supplemental display is supported by the arm in the first position, such that the first center axis corresponding with the first radius of curvature of the cylindrical surface for the reels, the second center axis corresponding with the second radius of curvature of the convex surface for the supplemental display, and the third center axis corresponding with the third radius of curvature of the curved edges may be disposed in a common plane.

In some implementations, the electronic display screen may be a capacitive touchscreen. The one or more memory devices may store additional computer-executable instructions which, when executed by the one or more processors, cause the one or more processors to cause one or more motors to spin the set of reels about the first center axis, responsive to a touch input received by the capacitive touchscreen.

In some implementations, the housing may include a center opening and a pair of slits disposed on opposite sides of the opening. The supplemental display may include a center region and a pair of elongated regions disposed on opposite sides of the center region. Direct lines-of-sight may exist from the center region of the supplemental display and through the center opening to one or more viewpoints external to the housing. Direct lines-of-sight may exist from the pair of elongated regions of the supplemental display and through the corresponding pair of slits to one or more viewpoints external to the housing. The housing may further include a pair of elongated mask portions. Each elongated mask portion may separate the center opening from a corresponding one of the slits, may be made of opaque material, and may be configured to mask a corresponding one of a pair of portions of the supplemental display in between the center region of the supplemental display and the elongated regions of the supplemental display.

In some implementations, the one or more memory devices may store additional computer-executable instructions which, when executed by the one or more processors, cause the one or more processors to: cause the center region of the supplemental display to present a first symbol of a set of one or more symbols along the first payline of the first set of one or more paylines, and cause the elongated regions of the supplemental display to present a plurality of graphical objects representing a plurality of LEDs.

In some implementations, the main display may further include a plurality of physical LEDs arranged proximate to a pair of edges of the cylindrical surfaces.

In some implementations, the one or more processors may determine whether the symbols displayed along the first payline, including the symbols displayed from the set of reels that are along the first payline and the one or more symbols on the supplemental display that are along the first payline, form a winning pattern.

In some implementations, the set of reels may include a set of mechanical reels each having a cylindrical surface with a first radius of curvature about a first center axis. Each of the mechanical reels may be configured to rotate about a first center axis. The supplemental display may include a transparent cover mounted to the housing and may have a convex surface with a second radius of curvature about a second center axis. The transparent cover may be located, responsive to the supplemental display being supported by the arm in the first position, relative to the main display such that the second center axis may be positioned up to one inch from the first center axis. The supplemental display may include a first split-flap display of a first set of one or more split-flap displays configured to display one of the symbols at a first location along a first payline of the first set of one or more paylines continued from the main display.

In some implementations, the first set of one or more split-flap displays may further include a second split-flap display and a third split-flap display. The first split-flap display, the second split-flap display, and the third split-flap display may be arranged in a vertical column, with the first split-flap display positioned between the second split-flap display and the third split-flap display. The first split-flap display, the second split-flap display, and the third split-flap display may be configured to collectively cycle through a plurality of consecutive states to display a plurality of symbol combinations for each of the consecutive states. The first split-flap display may be configured to display, for each of the consecutive states, one of the symbols at the first location along the first payline of the first set of one or more paylines. The second split-flap display may be configured to display, for each of the consecutive states, one of the symbols at a second location along a second payline of the first set of one or more paylines. The third split-flap display may be configured to display, for each of the consecutive states, one of the symbols at a third location along a third payline of the first set of one or more paylines. The one or more memory devices may store additional computer-executable instructions which, when executed by the one or more processors, cause the one or more processors to cause: the first split-flap display to display a predetermined symbol at the first location when the first set of one or more split-flap displays collectively are in a first state; the second split-flap display to display the predetermined symbol at the second location when the first set of one or more split-flap displays collectively are in a second state; and the third split-flap display to display the predetermined symbol at the third location when the first set of one or more split-flap displays collectively are in a third state.

In some implementations, the first split-flap display, the second split-flap display, and the third split-flap display may have a common configuration of split flaps with a common sequence of symbols. The one or more processors may cause the second split-flap display to show a next symbol in the sequence compared to the symbol shown in the first split-flap display, and cause the third split-flap display to show a previous symbol in the sequence compared to the symbol shown in the first split-flap display.

One or more non-transitory computer-readable media may (CRM) store computer-executable instructions which, when executed by one or more processors, cause the one or more processors to cause, responsive to an arm of a lever apparatus being moved from a first position to a second position: a main display in a cabinet of an electronic gaming machine to present a set of reels with a combination of symbols along a first payline of a first set of one or more paylines, and a supplemental display to present one or more symbols along the first payline of the first set of one or more paylines continued from the main display.

In some implementations, one or more CRM may store additional computer-executable instructions which, when executed by one or more processors, cause the one or more processors to: cause one or more motors to rotate a set of mechanical reels in the main display about a first center axis, responsive to a touch input being received by a capacitive touchscreen of a supplemental display for a display module of the lever apparatus or responsive to the arm of the lever apparatus being moved from a first position to a second position relative to the cabinet of the electronic gaming machine.

In some implementations, the one or more CRM may store additional computer-executable instructions which, when executed by one or more processors, cause the one or more processors to: cause, responsive to the touch input being received by the capacitive touchscreen or responsive to the arm being moved from the first position to the second position, a center region of the supplemental display to present a first symbol of a set of one or more symbols along the first payline of the first set of one or more paylines, and cause a pair of elongated regions of the supplemental display to present a plurality of graphical objects representing a plurality of LEDs.

A method for operating an electronic gaming machine may have a main display, a lever apparatus with a supplemental display, and one or more non-transitory computer readable storage media (CRM). The one or more CRM may have one or more processors and one or more memory devices storing computer-executable instructions. The method may include causing, responsive to an arm of the lever apparatus being moved from a first position to a second position, a main display in a cabinet of an electronic gaming machine to present a set of reels with a combination of symbols along a first payline of a first set of one or more paylines. The method may further include causing, responsive to the arm being moved from the first position to the second position, the supplemental display to present one or more symbols along the first payline of the first set of one or more paylines continued from the main display.

In some implementations, the method may further include causing one or more motors to rotate a set of mechanical reels in the main display about a first center axis, responsive to a touch input received by a capacitive touchscreen of the supplemental display for a display module of the lever apparatus.

In some implementations, the method may further include causing a center region of the supplemental display to present a first symbol of a set of one or more symbols along the first payline of the first set of one or more paylines. The method may further include causing a pair of elongated regions of the supplemental display to present a plurality of graphical objects representing a plurality of LEDs.

Figure 1:
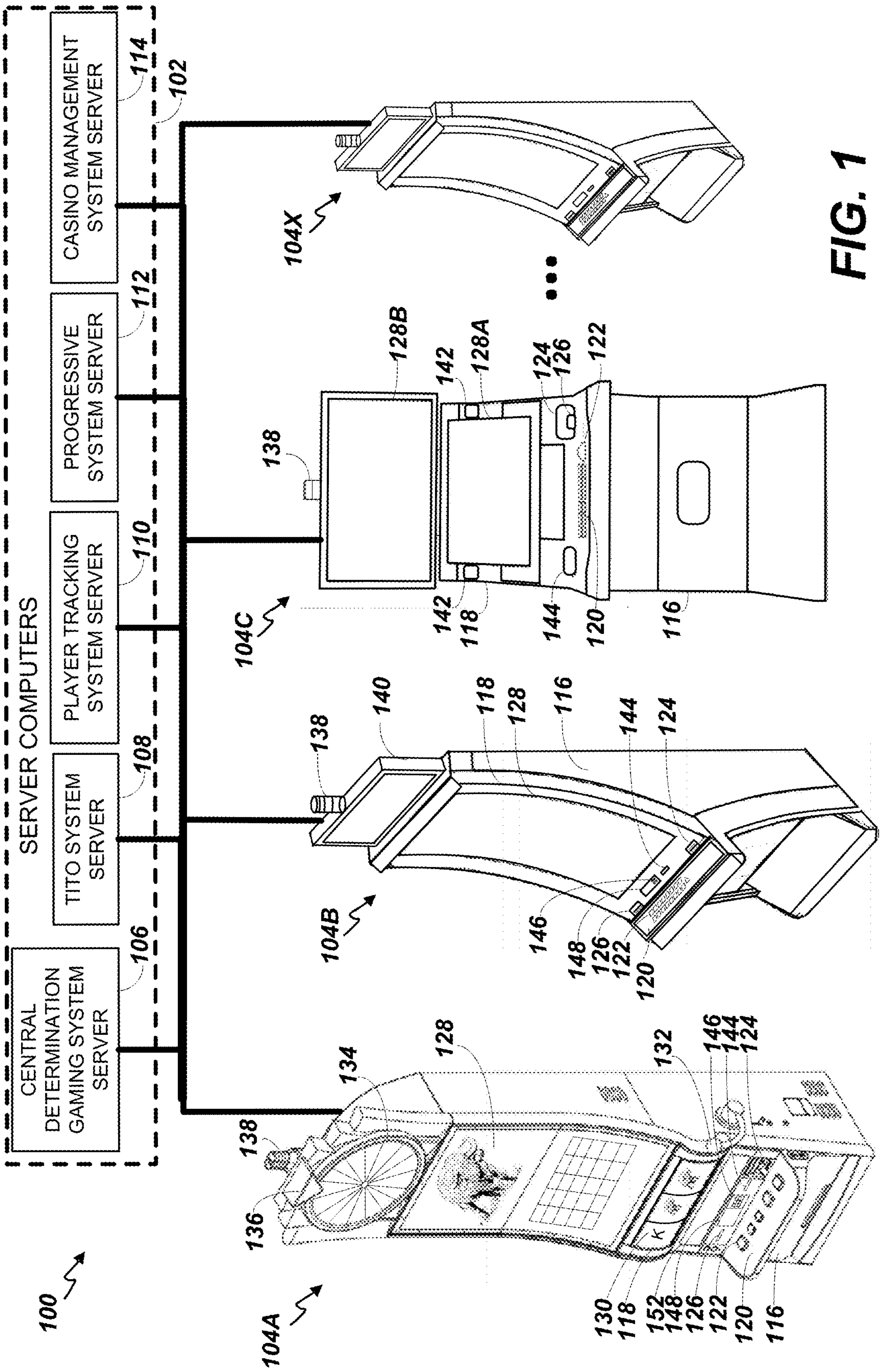
FIG. 1 is an exemplary diagram showing several EGMs networked with various gaming-related servers.

The Figures are provided for the purpose of providing examples and clarity regarding various aspects of this disclosure and are not intended to be limiting.

DETAILED DESCRIPTION

Examples of the present disclosure provide systems and methods of improving display device functionality (e.g., on a hybrid electro-mechanical EGM having both electronic components and mechanical reels, an EGM having only digital displays with virtual reels, a purely mechanical reel game machine, etc.). The gaming machine may have a main display in a main cabinet and supplemental display on a lever arm (e.g., slot pull-handle), with the main display and the supplemental display being visually linked to one another by parameters or characteristics (e.g., position, orientation, etc.) to convey to the user that they act in concert to provide game content.

The disclosed lever apparatus includes the display module with a supplemental display substantially aligned with the main display in the cabinet to provide the supplemental display and the main display with a generally common shape, orientation, position along a vertical axis, position along a horizontal axis, and/or other parameter in order to draw the attention of the player to the main display, the supplemental module, and the graphical objects and/or data collectively presented by the main display and the supplemental module. Each of the main display, the supplemental display, and the cabinet may have one or more corresponding parameters (e.g., a location along a vertical direction, a location along a horizontal direction, a size, a shape, etc.). One or more of these parameters for the supplemental display may be within a predetermined range of a corresponding parameter for the main display parameters and/or the cabinet (e.g., 90% to 110% of those parameters to substantially align one or more paylines presented by the main display with one or more symbols present by the supplemental display, to direct a player's attention to graphical objects and/or data collectively presented by the main display and the supplemental display and/or to provide aesthetic continuity across the gaming machine and/or a bank of these gaming machines, etc.). In implementations where the supplemental display may be an electronic display screen, the electronic display screen may present graphical objects representing symbols on a floating virtual reel and positioned on one or more paylines continued from the main display, thus providing additional game play options. Also, in implementations where the supplemental display may be the electronic display screen, virtual reels on the electronic display screen may only require a software update to replace obsolete symbols with new symbols, thus decreasing downtime of the gaming machine and minimizing the corresponding loss of entertainment for the players and loss of profit for the gambling facilities. Furthermore, in implementations where the main display in the cabinet may include mechanical reels and the supplemental display in the lever apparatus may be the electronic display screen (e.g., a high-resolution LCD panel, a plasma display panel, a LED panel, an OLED panel, AMOLED panel, a capacitive touchscreen, etc.), the combination of mechanical reels and the electronic display screen may attract players who may normally have a preference for mechanical EGMs, thereby potentially exposing them to a hybrid game featuring both mechanical and digital aspects.

The following discussion provides overall context for gaming machines that may be used to implement the mechanical lever with display to provide game play options such as is described above and later herein. Following this overview, a more focused discussion of the mechanical lever with the display concepts discussed above is provided.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
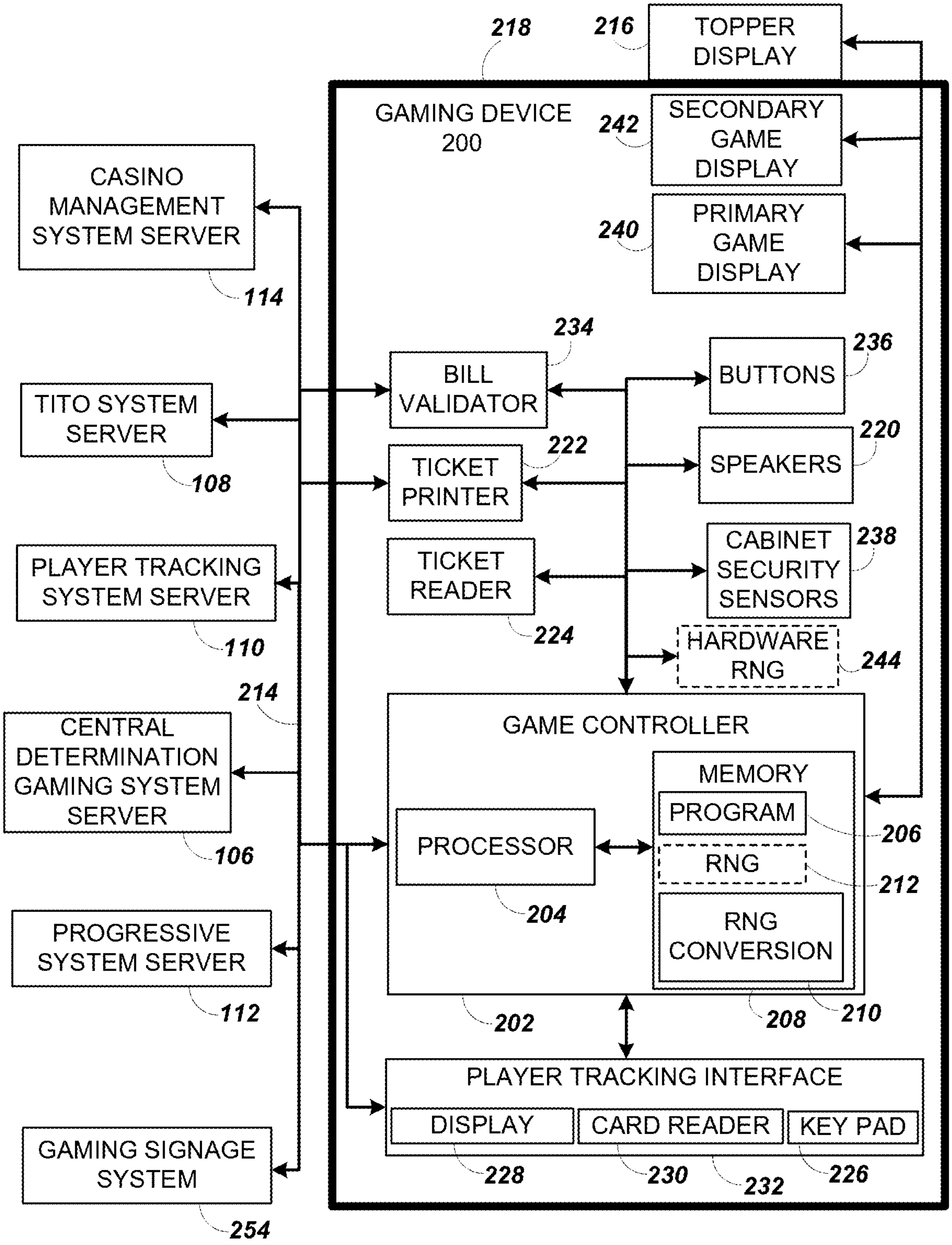
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows gameplay functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
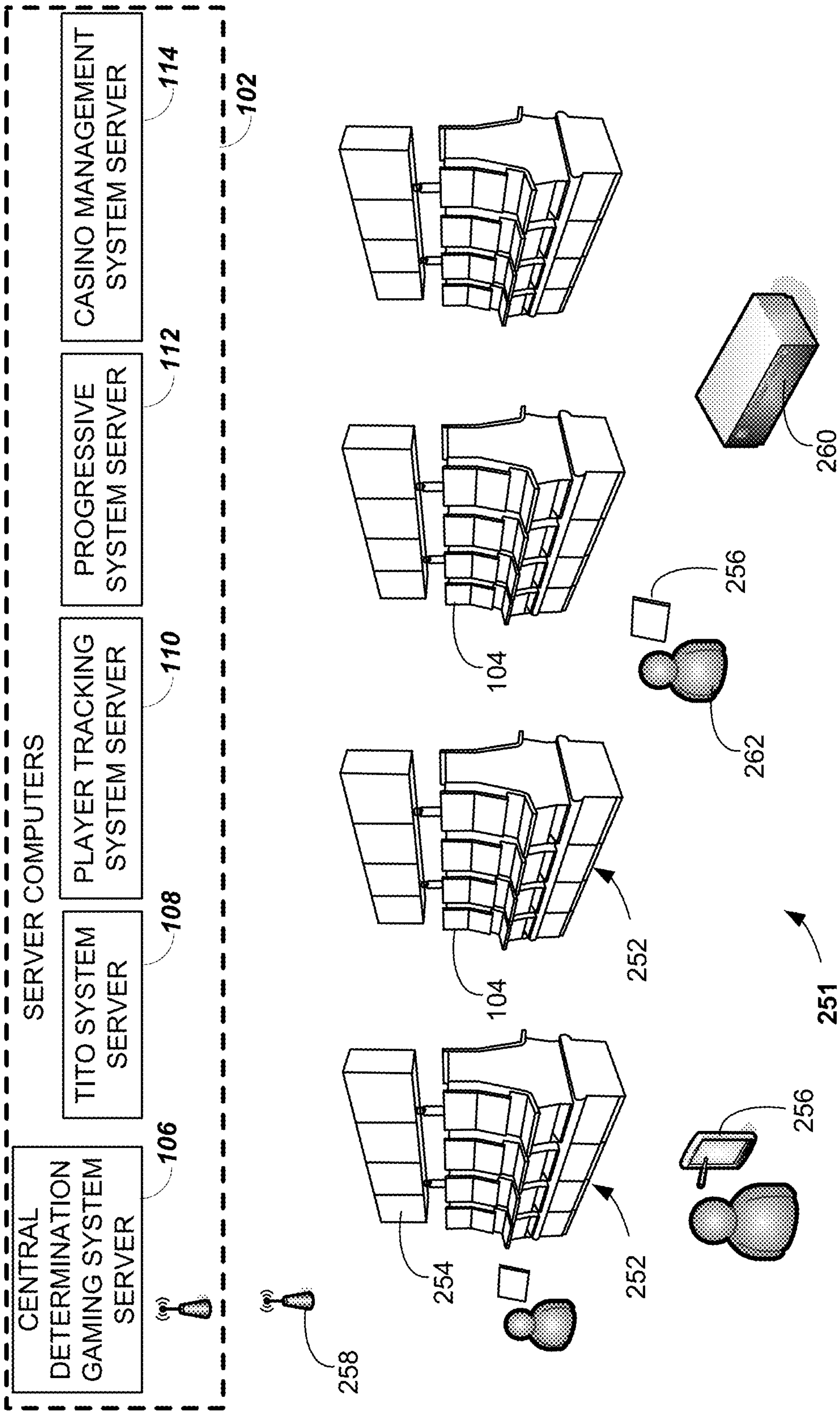
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
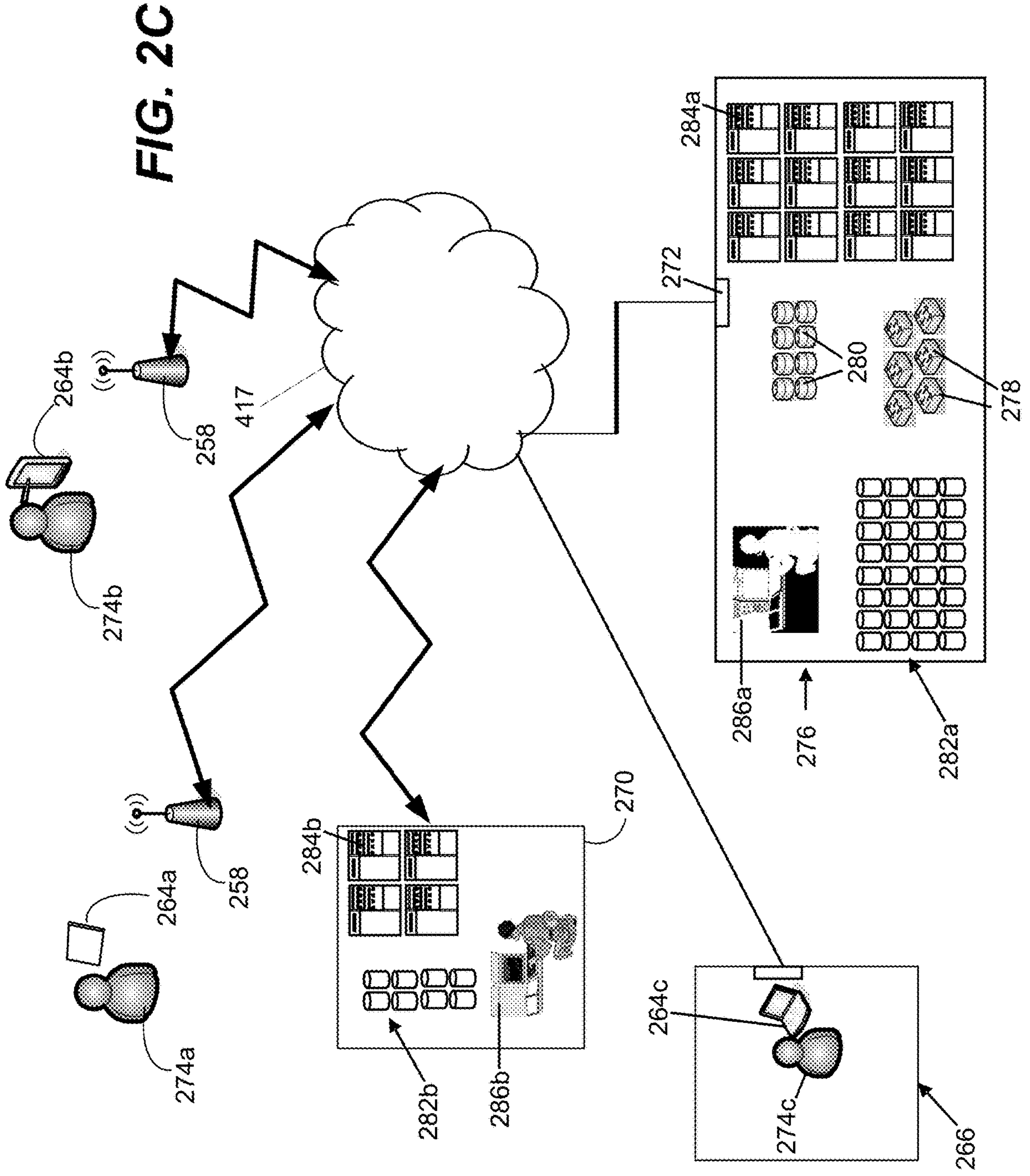
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
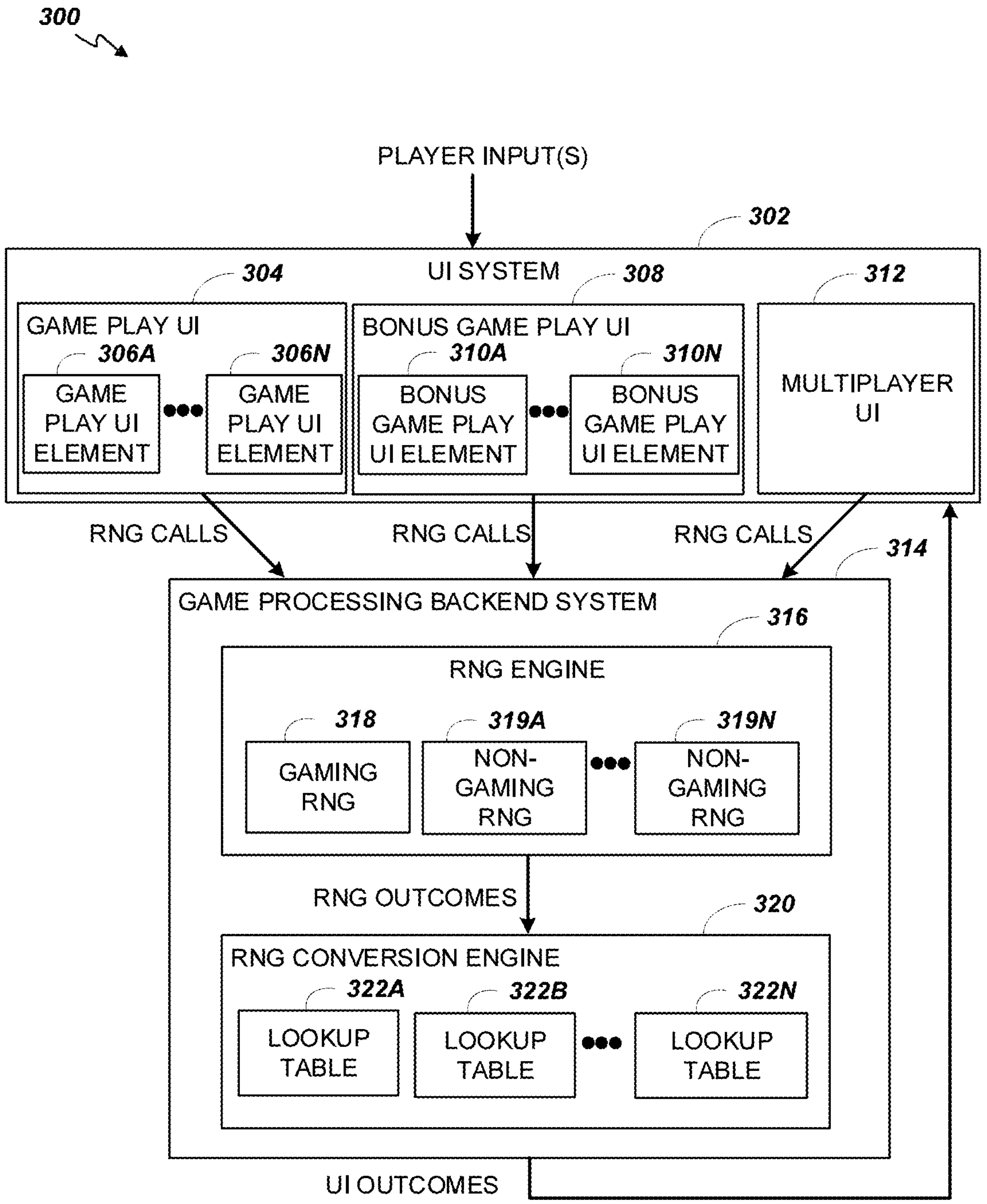
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UI s that a player can interact with. The UI system 302 could include one or more gameplay UI s 304, one or more bonus gameplay UI s 308, and one or more multiplayer UI s 312, where each UI type includes one or more mechanical UI s and/or graphical UI s (GUIs). In other words, gameplay UI 304, bonus gameplay UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as gameplay UI elements 306A-306N and bonus gameplay UI elements 310A-310N.

The gameplay UI 304 represents a UI that a player typically interfaces with for a base game. During a game instance of a base game, the gameplay UI elements 306A-306N (e.g., GUI elements depicting one or more virtual reels) are shown and/or made available to a user. In a subsequent game instance, the UI system 302 could transition out of the base game to one or more bonus games. The bonus gameplay UI 308 represents a UI that utilizes bonus gameplay UI elements 310A-310N for a player to interact with and/or view during a bonus game. In one or more implementations, at least some of the gameplay UI element 306A-306N are similar to the bonus gameplay UI elements 310A-310N. In other implementations, the gameplay UI element 306A-306N can differ from the bonus gameplay UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents gameplay information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more gameplay UI elements 306A-306N, such as symbols, for the gameplay UI 304. In another example, if the UI outcome is for a bonus game, the UI system could update one or more bonus gameplay UI elements 310A-310N (e.g., symbols) for the bonus gameplay UI 308. In response to updating the appropriate UI, the player may subsequently provide additional player inputs to initiate a subsequent game instance that progresses through the game processing pipeline.

FIGS. 4 through 7, as noted above, depict various views of another implementation of the EGM 400 of FIG. 1. The EGM 400 includes a cabinet 402 with a main display 404 and a lever apparatus 406 with a display module 408 having a supplemental display 410. The supplemental display 410 is configured to present one or more graphical objects (e.g., symbols, data otherwise shown in a topper omitted from the EGM 400, etc.) and/or data combined, pursuant to game mechanics, with graphical objects and/or data presented by the main display 404 (e.g., along one or more paylines in the main display 404 to provide additional game play options. As described in detail below, the main display 404, the supplemental display 410, and the cabinet 402 may be, in some way, visually linked by parameters or characteristics (e.g., position, orientation, etc.) to convey to the user that they act in concert to provide game content. In addition, while the mechanical reels may require a technician to replace artwork representing the symbols by opening the EGM to physically remove the artwork and attach new artwork, EGMs 400 with the electronic display screens 412 may only require a software update to change the graphical objects, thus decreasing or preventing downtime of the gaming machine.

Figure 4:
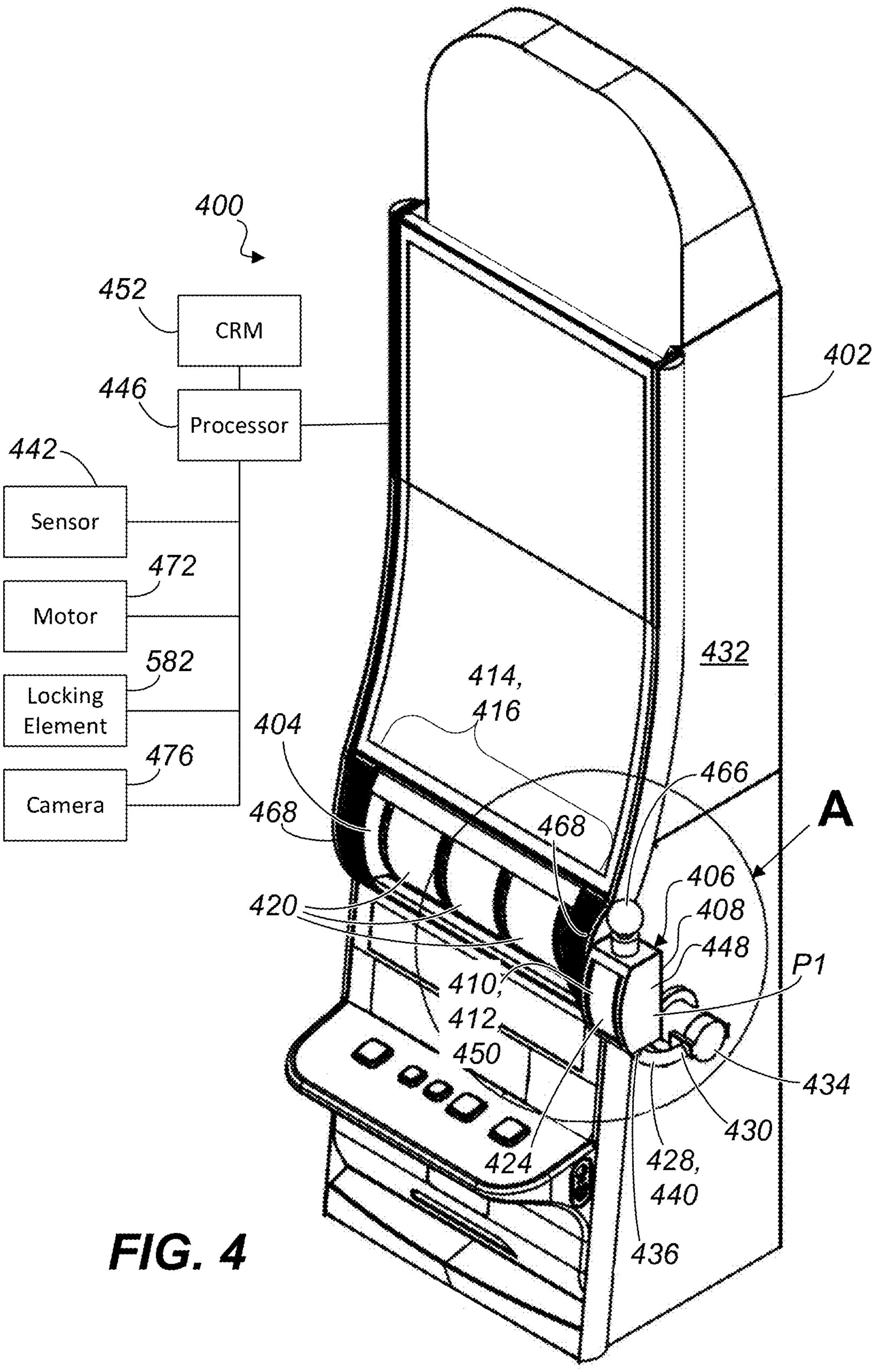
FIG. 4 depicts a diagram of another implementation of the EGM of FIG. 1, illustrating the EGM including a cabinet, a main display, a lever apparatus, a non-transitory computer readable storage medium, and a processor.
Figure 5:
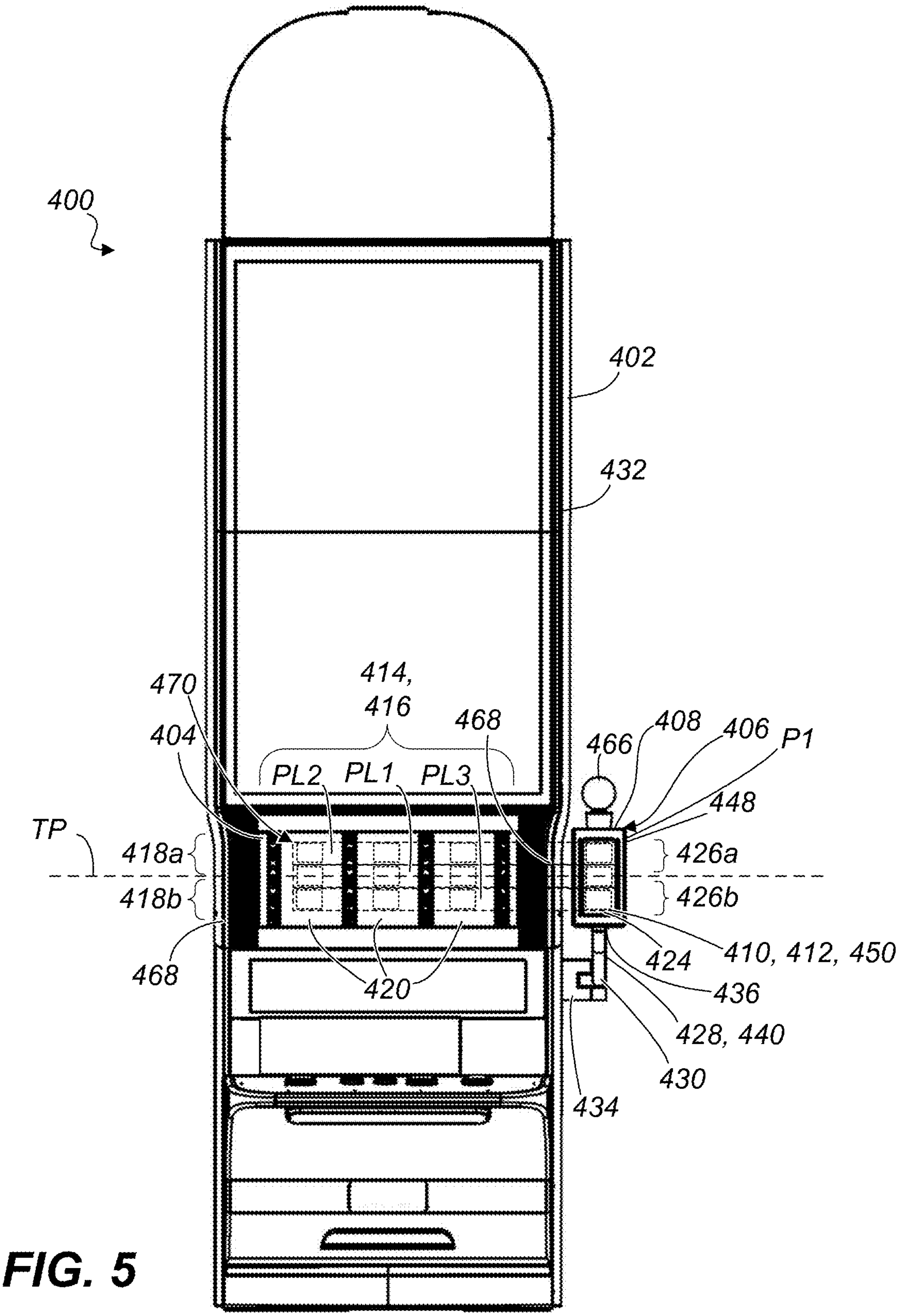
FIG. 5 depicts a front plan view of the EGM of FIG. 4, illustrating an example implementation of the main display having a transverse plane and the lever apparatus having a supplemental display with a center located within the transverse plane of the main display.

Referring to FIG. 4, the cabinet 402 includes the main display configured to present a set of reels 414 each having a plurality of symbols, and in this implementation, the set of reels 414 is a set of mechanical reels 416. These mechanical reels 416 have a first half portion 418*a* and a second half portion 418*b* disposed on opposing sides of a transverse plane TP (i.e., a first bisecting horizontal plane) for the mechanical reels 416. Each mechanical reel 416 has a cylindrical surface 420 with a first radius of curvature RC1 (FIG. 6) about a first center axis CA1, and each mechanical reel 416 is configured to spin about the first center axis CA1. Also, in this implementation, the main display 404 further includes a plurality of physical LEDs 422 (FIG. 7) arranged in a pair of strips positioned on a corresponding one of the vertical sides of each mechanical reel 416. In other implementations, the main display 404 may be an electronic display screen 412 having a curved surface similar to a visible portion of the cylindrical surface of a mechanical reel but simply display an animation of spinning reels. In still other implementations, the electronic display screen 412 may have a flat surface. In one or more implementations (i.e., including the curved surface and/or the flat surface), the electronic display screen 412 includes the first half portion 418*a* and the second half portion 418*b* on opposing sides of the transverse plane TP.

Figure 8:
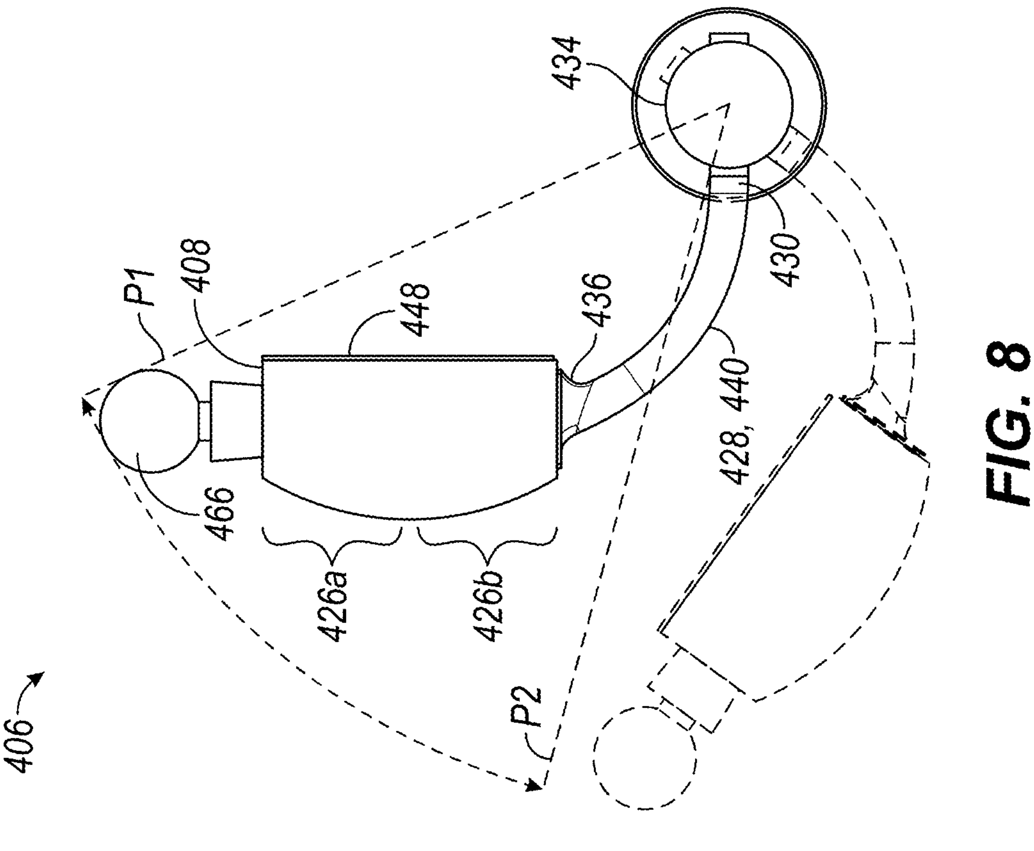
FIG. 8 depicts a side plan view of the lever apparatus of FIG. 4, illustrating the lever apparatus having an arm, a display module removably coupled to the arm and including a housing with the supplemental display, and a handle removably coupled to the housing.
Figure 11:
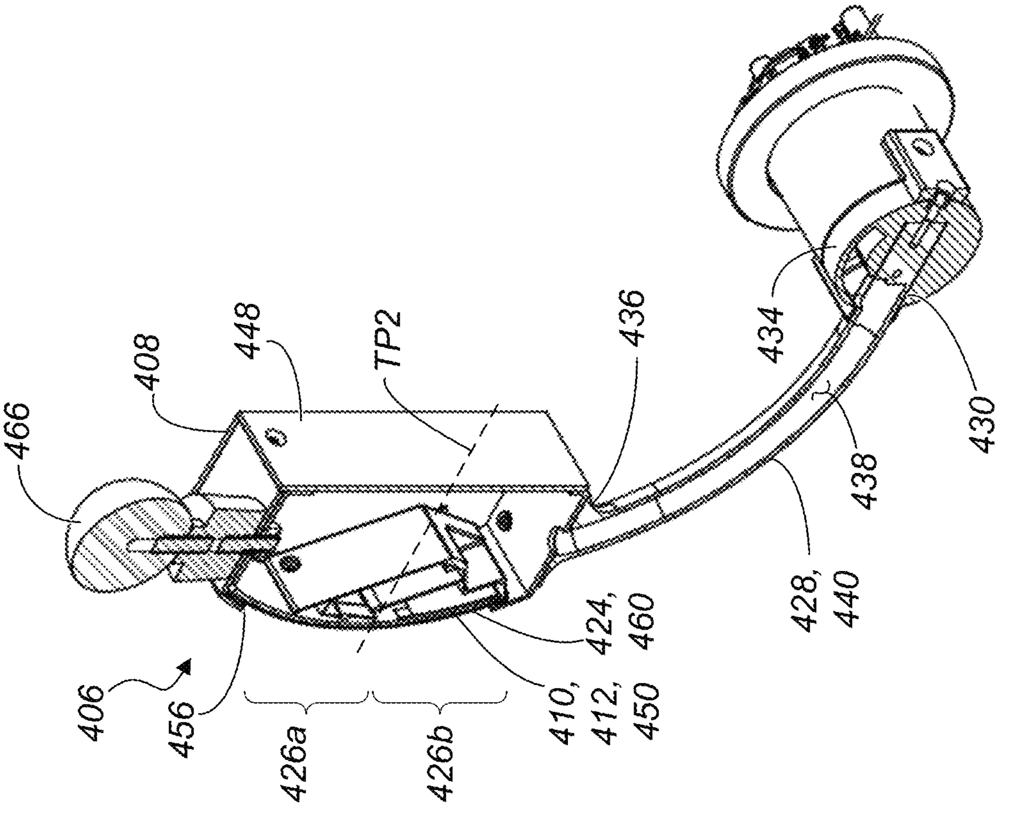
FIG. 11 depicts a perspective cross-sectional view of the lever apparatus of FIG. 10, as taken along line B-B.

The lever apparatus 406 includes an arm 428 having a first end portion 430 mounted to a side 432 of the cabinet 402 (FIG. 7), e.g., via a hub 434 rotatably coupled to the cabinet 402. The arm 428 further includes a second end portion 436 (FIG. 11) opposite to the first end portion 430. The arm 428 is configured to move between a first position P1 (FIGS. 6 and 8) and a second position P2 (FIG. 8), e.g., in a pivoting or arcuate motion. In one implementation where the supplemental display 410 is an electronic display screen 412 as described below, the arm 428 may be a curved tube with a passage 438 (FIG. 11) configured to receive wiring (not shown) supplying data and/or electrical current to the electronic display screen 412. The passage 438 in the curved tube 440 may be free of corners (e.g., a 90-degree corners) that may otherwise hinder feeding wires through the passage 438 and/or provide a stress riser in the arm 428. In other implementations, the arm 428 may be mounted to other portions of the cabinet 402 by other couplings configured to permit the arm 428 to move between the first position and the second position in other suitable motions (e.g., a linear reciprocation motion, etc.).

The EGM 400 may further include a sensor 442 configured to generate a signal responsive, at least in part, to the arm 428 moving from the first position P1 to the second position P2. As further described below, one implementation of the EGM 400 may initiate an instance of a game, deactivate a lock 444 to permit a mechanical supplemental display 510 (FIG. 13) to display a new graphical object representative of a symbol at a next state, etc., responsive, at least in part, to a processor 446 receiving the signal from the sensor 442.

As noted above, the lever apparatus 406 further includes the display module 408 having the supplemental display 410. The display module 408 includes a housing 448 removably coupled to the second end portion 436 of the arm 428. Because the EGM 400 includes the supplemental display 410 mounted to the side of the cabinet 402, the EGM 400 may, for example, omit a display that might otherwise be located at a top of the cabinet (e.g., a display in addition to the main display that is included to display additional content for a bonus game may no longer be needed since the main display and the supplemental display may be usable to display such content; this may allow such an EGM 400 to be used in situations where there is limited vertical clearance for the EGM, such as on a cruise ship, etc.). The supplemental display 410 is removably coupled to the housing 448. In this implementation, the supplemental display 410 is the electronic display screen 412, such as a capacitive touchscreen 450 including an input (e.g., a touch panel) and an output (e.g., a flexible LCD panel, a flexible plasma display panel, a flexible LED panel, a flexible OLED panel, a flexible AMOLED panel, etc.). As described below in connection with the EGM 400 having one or more processors 446 and one or more memory devices 452, the input for the capacitive touchscreen 450 may receive a touch input (e.g., a tap input, a double tap input, a touch-and-hold input, a swipe input, a high-five input, etc.). As discussed below with reference to FIG. 13, responsive to the touch input, the main display 404 may present the set of reels 414 with a combination of the symbols along a first payline PL1 of a first set of one or more paylines 470. In one implementation where the set of reels 414 are mechanical reels 416, one or more processors 446 may cause one or more motors 472 to spin the set of mechanical reels 416 about the first center axis CA1 (e.g., and along a direction corresponding with a direction of a swipe input). The one or more processors 446 may further cause, responsive to the input, the supplemental display 410 to present one or more symbols along the first payline PL1 of the first set of one or more paylines 470 continued from the main display 404. In one implementation, the one or more processors 446 may cause, responsive to the input, the center region 460 of the supplemental display 410 to present a first symbol of a set of one or more symbols along the first payline PL1 of the first set of one or more paylines 470 and further cause the elongated regions 462 of the supplemental display 410 to present a plurality of graphical objects representing a plurality of virtual LEDs 474. In another implementation, as discussed with reference to FIG. 12, the supplemental display 510 may be a mechanical display (e.g., one or more split-flap displays 578 to attract players who prefer to use gaming machines with mechanical components over virtual reels).

The supplemental display 410 supported by the arm 428 in the first position P1 appears to be an "extra" reel (i.e., a reel floating in space that is outside of the main cabinet 402) and can be used to enhance or expand game play occurring on the main display 404. As discussed above, the main display 404 and the supplemental display 410 are visually linked to one another by parameters or characteristics (e.g., position, orientation, etc.) to convey to the user that they act in concert to provide game content (e.g., to help players understand the game mechanics). These parameters for one or more portions of the supplemental display 410 (e.g., a location along a vertical direction, a location along a horizontal direction, a size, a shape, etc.) may be within a predetermined range of the corresponding parameters of the separate main display 404 in the cabinet 402 (e.g., to illustrate a connection or continuity between the separate main display 404 and the separate supplemental display 410). In some implementations (e.g., where the main display 404 and/or the supplemental display 410 are free of any curved surfaces with corresponding radii of curvature about center axes, etc.), the supplemental display 410 includes a center C. The supplemental display 410 is located, when the supplemental display 410 is supported by the arm 428 in the first position P1, relative to the main display 404 such that the center C of the supplemental display 410 is positioned up to one inch along a vertical direction (i.e., along a Y-axis extending between a top of the EGM and a bottom of the EGM) from the transverse plane TP of the main display 404. In other implementations, the supplemental display 410 may be located, when the supplemental display 410 is supported by the arm 428 in the first position P1 or other positions, relative to the main display 404 such that the center C of the supplemental display 410 and the transverse plane TP of the main display 404 are co-planar (i.e., the same plane along the Y-axis). Furthermore, the supplemental display 410 (e.g., the electronic display screen 412 with a flexible screen) has a convex surface 424 with a second radius of curvature RC2 (FIG. 6) about a second center axis CA2. The supplemental display 410 is located, when the supplemental display 410 is supported by the arm 428 in the first position P1, relative to the main display 404 such that the second center axis CA2 corresponding with the convex surface 424 of the supplemental display 410 is positioned up to four inches along a horizontal direction (i.e., along a Z-axis extending between a front side of the EGM to a back side of the EGM) from the first center axis CA1 of cylindrical surface 420 of the mechanical reels 416 for the main display 404. Moreover, a ratio of the second radius of curvature RC2 for the convex surface 424 of the supplemental display 410 to the first radius of curvature RC1 for the cylindrical surface 420 of each of the mechanical reels 416 may be within a range between 1:1 and 1.5:1. The above non-limiting example ranges of values for these example parameters or other suitable parameters of the main display 404 and the supplemental display 410, respectively, may provide a visual indication that game mechanics require the player to consider a combination of the graphical objects and/or data presented by the supplemental display 410 and the graphical objects and/or data presented by the main display 404 (e.g., game mechanics defining one or more winning symbol combinations based on one or more graphical objects representing corresponding symbols in the supplemental display 410 in combination with graphical objects representing corresponding symbols in one or more paylines presented in the main display 404).

Figure 9:
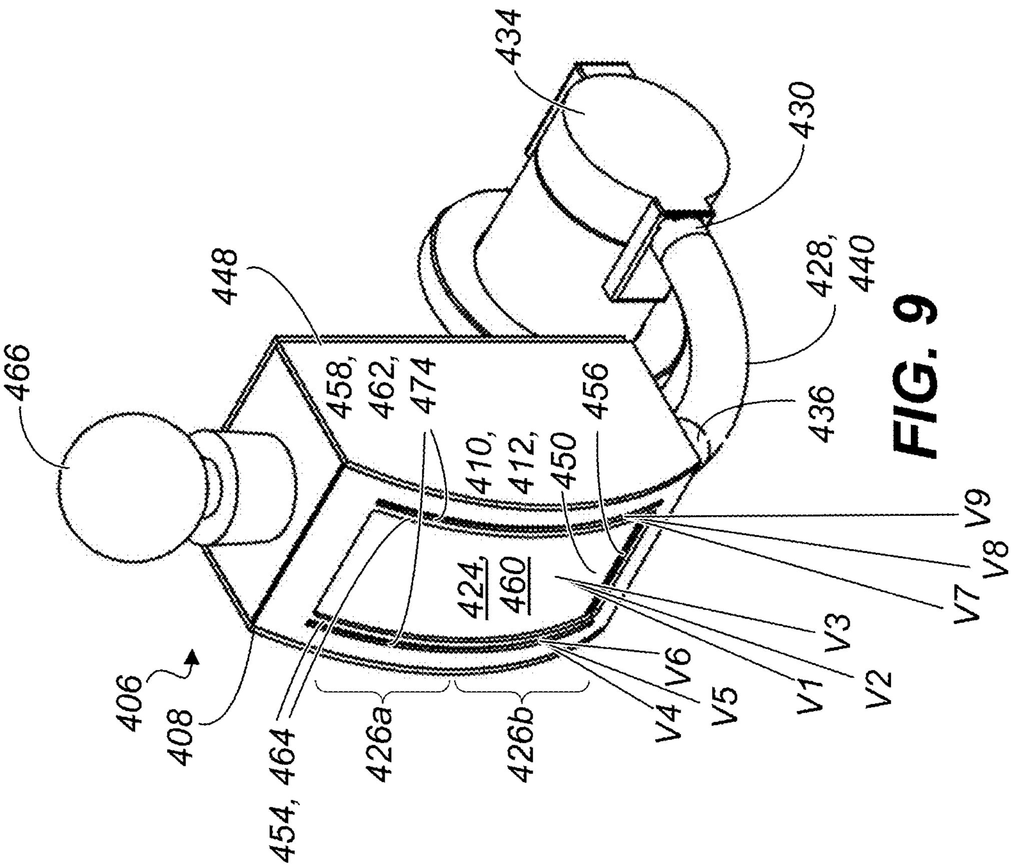
FIG. 9 depicts a perspective view of the lever apparatus of FIG. 4.
Figure 10:
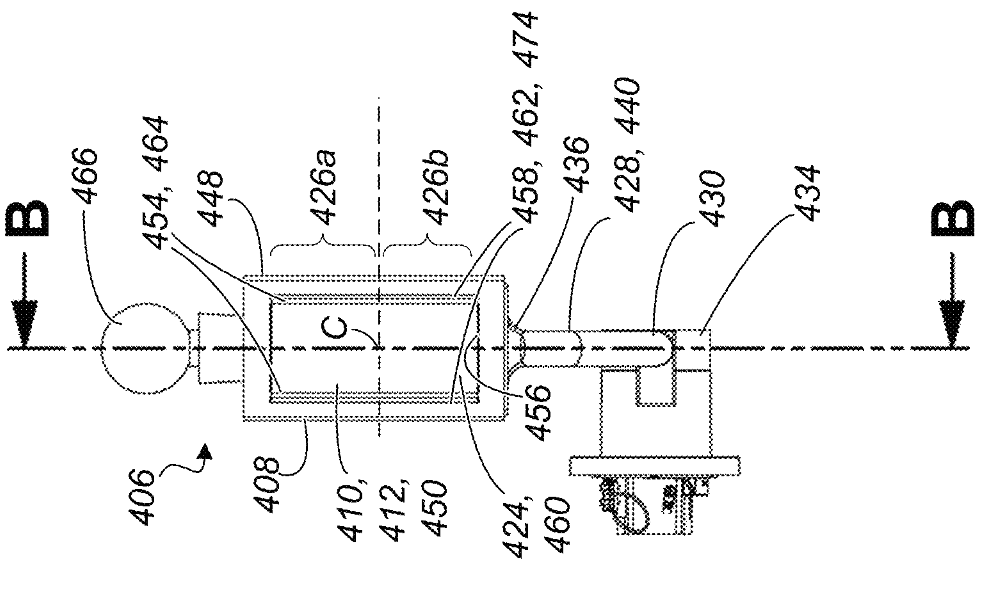
FIG. 10 depicts a front plan view of the lever apparatus of FIG. 4.

Referring to FIGS. 9 and 10, the housing 448 includes one or more windows configured to provide multiple direct lines of sight from one or more corresponding regions of the supplemental display 410 to viewpoints external to the housing 448, and the housing 448 includes one or more masks 454 occluding lines of sight to other corresponding regions of the supplemental display 410. In this implementation, the housing 448 includes a center opening 456 and a pair of slits 458 on opposite sides of the center opening 456. The supplemental display 410 (e.g., the electronic display screen 412, etc.) includes a center region 460 and a pair of elongated regions 462 on opposite sides of the center region 460. Multiple direct lines-of-sight exist from the center region 460 of the supplemental display 410 and through the center opening 456 to one or more viewpoints V1, V2, V3 external to the housing 448. In an analogous manner, multiple direct lines-of-sight exist from each of the elongated regions 462 of the supplemental display 410 and through the corresponding slits 458 to one or more viewpoints V4, V5, V6, V7, V8, V9 external to the housing 448. The housing 448 may include a pair of elongated mask portions 464 (e.g., columns, strips, etc.) separating the center opening 456 from a corresponding one of the slits 458. Each of these mask portions 464 is made of opaque material and configured to occlude a pair of corresponding portions of the supplemental display 410 proximal to the elongated regions 462 of the supplemental display 410.

More specifically, in implementations where the supplemental display 410 is an electronic display screen 412, the masks 454 may be configured to provide an illusion that graphical content presented in the electronic display screen 412 is physical and tangible (e.g., in order to attract players who prefer to use gaming machines with mechanical reels over virtual reels). For instance, the center region 460 of the electronic display screen 412 may present content representing a virtual reel and the elongated regions 462 of the electronic display screen 412 may present one or more graphical objects representing virtual LEDs arranged in columns corresponding with the elongated regions and animated to spin similar to physical LEDs on the mechanical reels 416, or to appear to move or pulse in tandem with rotational movement of the reels. The elongated mask portions 464 of the housing 448 may be configured to represent a physical portion of that virtual reel or an environment surrounding that virtual reel and the virtual LEDs and thus facilitating an illusion that the virtual reel is a mechanical reel.

The display module 408 further includes a handle 466 removably coupled to the housing 448 and configured to transmit force from a player to the lever apparatus 406 to move the arm 428 to the first position or the second position. When the display module 408 requires maintenance, repair, or replacement, the display module 408 may be removed from the arm 428, and the handle 466 may be removably coupled directly to the arm 428 in order to transmit force from a player to the lever apparatus 406 in order to move the arm 428 to the first position P1 or the second position P2 thus minimizing downtime of the EGM 400. In this implementation, the handle 466 is a spherical ball threadably fastened to the housing 448 via a pedestal and one or more threaded fasteners. In other implementations, the handle 466 may have other shapes (e.g., a prolate spheroid shape, i.e., a shape of a football, a beer keg tap handle, etc.). In still other implementations, the handle 466 may include LEDs, haptic feedback devices with eccentric rotating mass actuators, and/or electrical grounding features.

Figure 6:
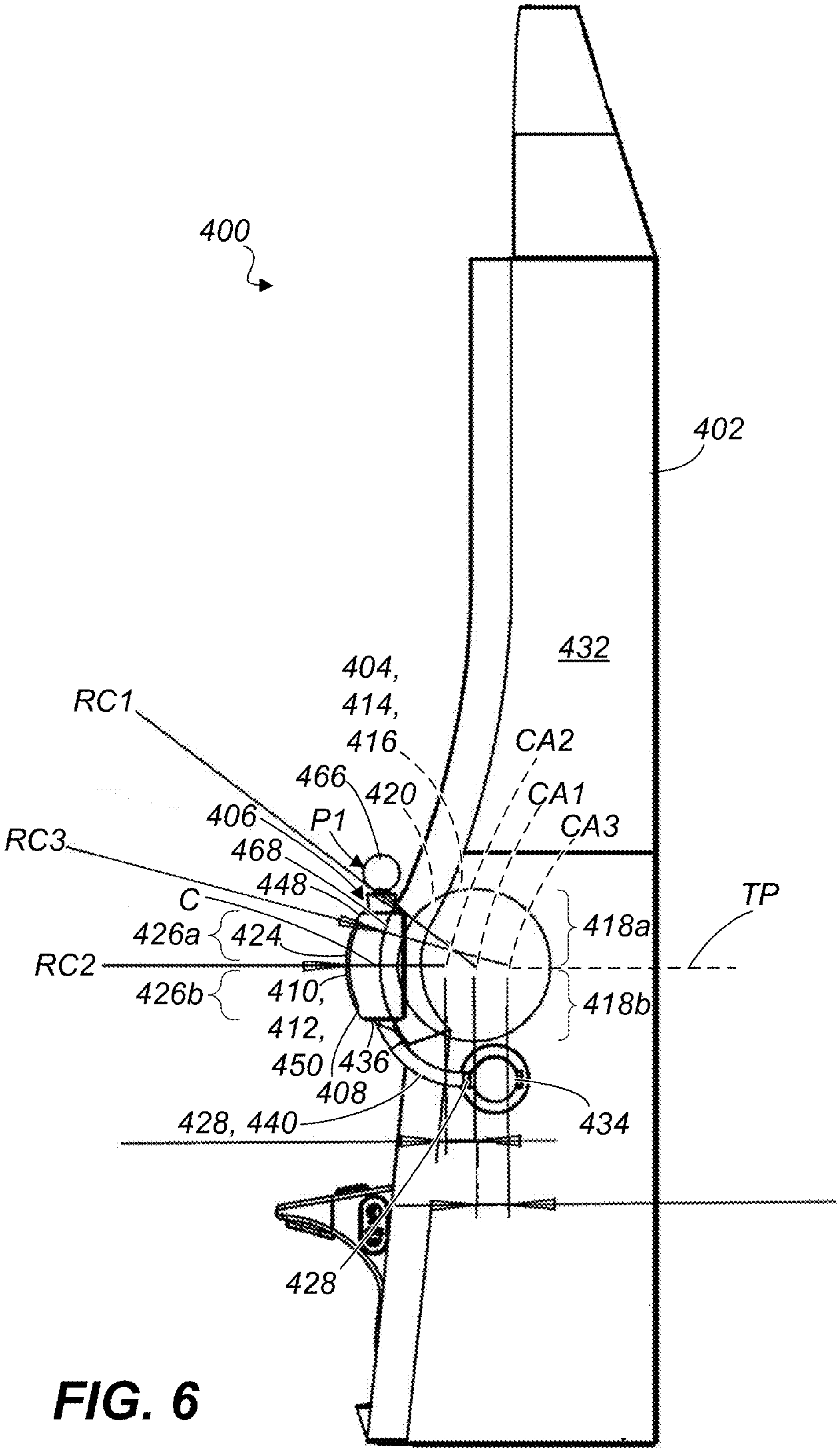
FIG. 6 depicts a side view of the EGM of FIG. 4, showing the main display including a cylindrical surface with a first radius of curvature about a first center axis, the supplemental display including a convex surface with a second radius of curvature about a second center axis, and a curved edge of the cabinet with a third radius of curvature about a third center axis.
Figure 7:
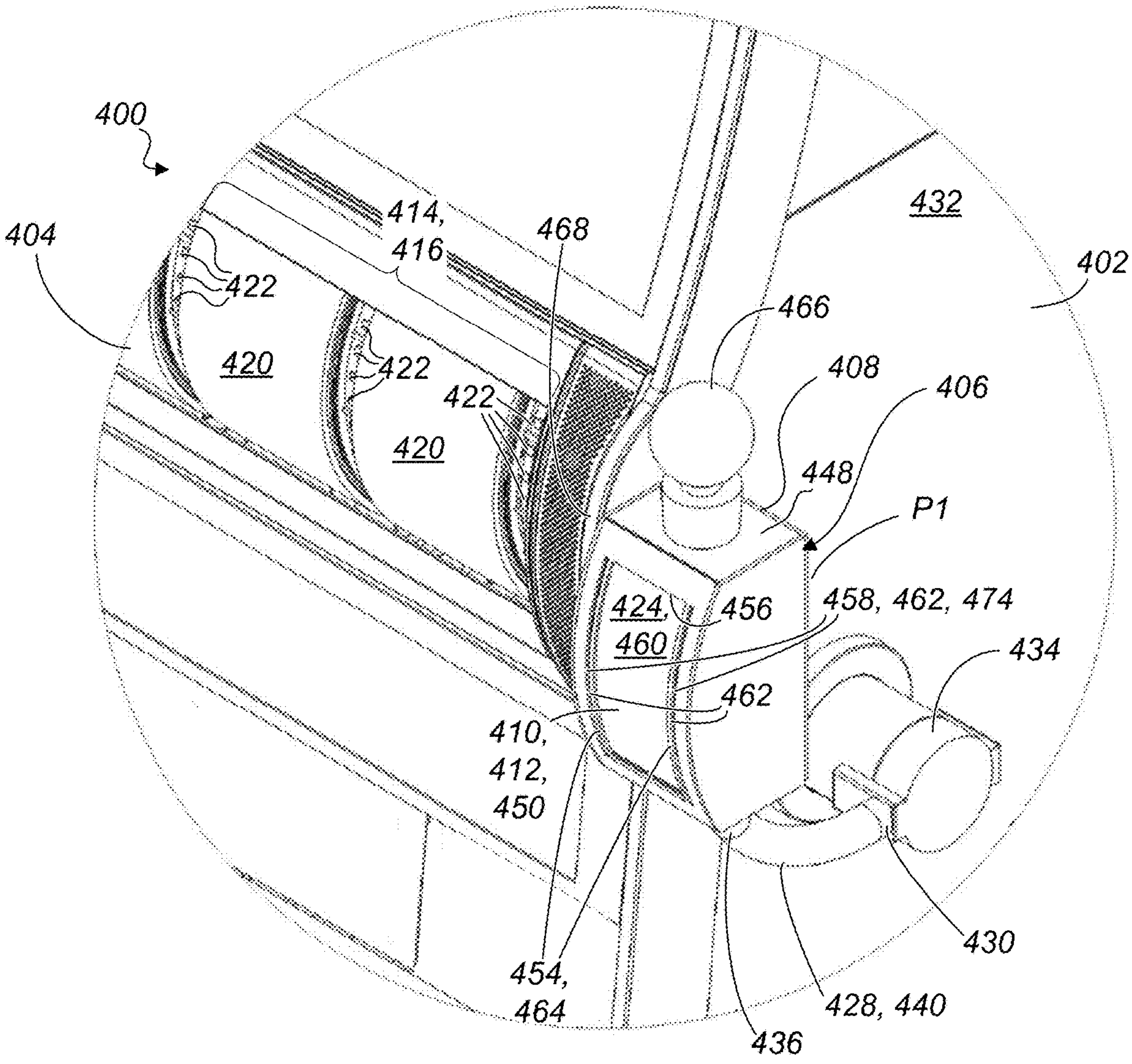
FIG. 7 depicts an enlarged view of Region A of the EGM of FIG. 4.

In one implementation, the cabinet 402 may include one or more parameters or characteristics (e.g., position, orientation, etc.) linked to corresponding parameters or characteristics of the main display 404 and the supplemental display 410 to convey to the user that the main display 404 and the supplemental display 410 act in concert to provide game content (e.g., to help players understand the game mechanics). In this implementation, the cabinet 402 may have a pair of curved edges 468 on opposite sides of the main display 404. Each of the curved edges 468 may have a third radius of curvature RC3 about a third center axis CA3 (FIG. 6). The supplemental display 410 may be located, responsive to the supplemental display 410 being supported by the arm 428 in the first position P1, relative to the pair of curved edges 468 such that the center C of the supplemental display 410 may be positioned up to one inch along the vertical direction (i.e., along the Y-axis) from the third center axis CA3 corresponding with the curved edges of the cabinet. In this non-limiting implementation, the set of mechanical reels 416, the supplemental display 410 of the lever apparatus 406, and the curved edges 468 of the cabinet 402 may be positioned relative to one another, when the supplemental display 410 is supported by the arm 428 in the first position P1, such that the first center axis CA1 corresponding with the first radius of curvature RC1 of the cylindrical surface 420 for the mechanical reels 416, the second center axis CA2 corresponding with the second radius of curvature RC2 of the convex surface 424 for the supplemental display 410, and the third center axis CA3 corresponding with the third radius of curvature RC3 of the curved edges 468 are disposed in a common plane. In other implementations, any one or more of the mechanical reels 416, the supplemental display 410, and the curved edges 468 may be located such that the corresponding center axes are offset from one or more of the other features 416, 410, 468 in a vertical direction by a predetermined maximum vertical offset (e.g., up to one inch along the vertical direction, i.e., along the Y-axis). Moreover, a ratio of the third radius of curvature RC3 for the curved edges 468 to the second radius of curvature RC2 for the convex surface 424 of the supplemental display 410 is within a range between 1:1 and 1.5:1. The above non-limiting example ranges of values for these example parameters or other suitable parameters of the supplemental display 410 and the curved edges 468, respectively, may provide a visual indication of a bridge or connection between the supplemental display 410 and the main display 404. Thus, the visual indication may further indicate that game mechanics require the player to consider a combination of the graphical objects and/or data presented by the supplemental display 410 and the graphical objects and/or data presented by the main display 404 (e.g., game mechanics defining one or more winning symbol combinations based on one or more graphical objects representing corresponding symbols in the supplemental display 410 in combination with graphical objects representing corresponding symbols in one or more paylines presented in the main display 404). In other implementations, the cabinet 402 may not include any parameters or characteristics (e.g., position, orientation, etc.) linked to corresponding parameters or characteristics of the main display 404 and the supplemental display 410 (e.g., the cabinet 402 may include edges that are linear instead of curved and thus those edges may not be linked to any parameters or characteristics of the cylindrical surface 420 of the mechanical reels 416 and the convex surface 424 of the supplemental display 416.) Put another way, in other implementations, the supplemental display 410 of the lever apparatus 406 is not positioned relative to any edge or other portions of the cabinet 402 but rather may be positioned relative only to parameters or characteristics of the main display 404, when the supplemental display 410 is supported by the arm 428 in the first position P1.

The EGM 400 further includes one or more processors 446 and one or more memory devices 452. The one or more memory devices 452 include one or more non-transitory computer-readable media (CRM) storing computer-executable instructions which, when executed by the one or more processors 446, cause the one or more processors 446 to cause, responsive to the arm 428 being moved from the first position P1 to the second position P2, the main display 404 to present the set of reels 414 with a combination of the symbols along a first payline PL1 of a first set of one or more paylines 470. The one or more processors 446 may further cause one or more motors 472 to spin the set of mechanical reels 416 about the first center axis CA1, responsive to a touch input received by the capacitive touchscreen 450 of a supplemental display for a display module of the lever apparatus. As noted above, non-limiting examples of the touch input may include at least a tap input, a double tap input, a touch-and-hold input, a swipe input, a high-five input, and/or other touch inputs. The one or more processors 446 may further cause, responsive to the arm 428 being moved from the first position P1 to the second position P2, the supplemental display 410 to present one or more symbols along the first payline PL1 of the first set of one or more paylines 470 continued from the main display 404. The one or more processors 446 may further cause, responsive to the touch input being received by the capacitive touchscreen 450 or responsive to the arm 428 being moved from the first position P1 to the second position P2, the center region 460 of the supplemental display 410 to present a first symbol S1 of a set of one or more symbols along the first payline PL1 of the first set of one or more paylines 470. The one or more processors 446 may further cause the elongated regions 462 of the supplemental display 410 to present a plurality of graphical objects representing a plurality of virtual LEDs 474.

Figure 12:
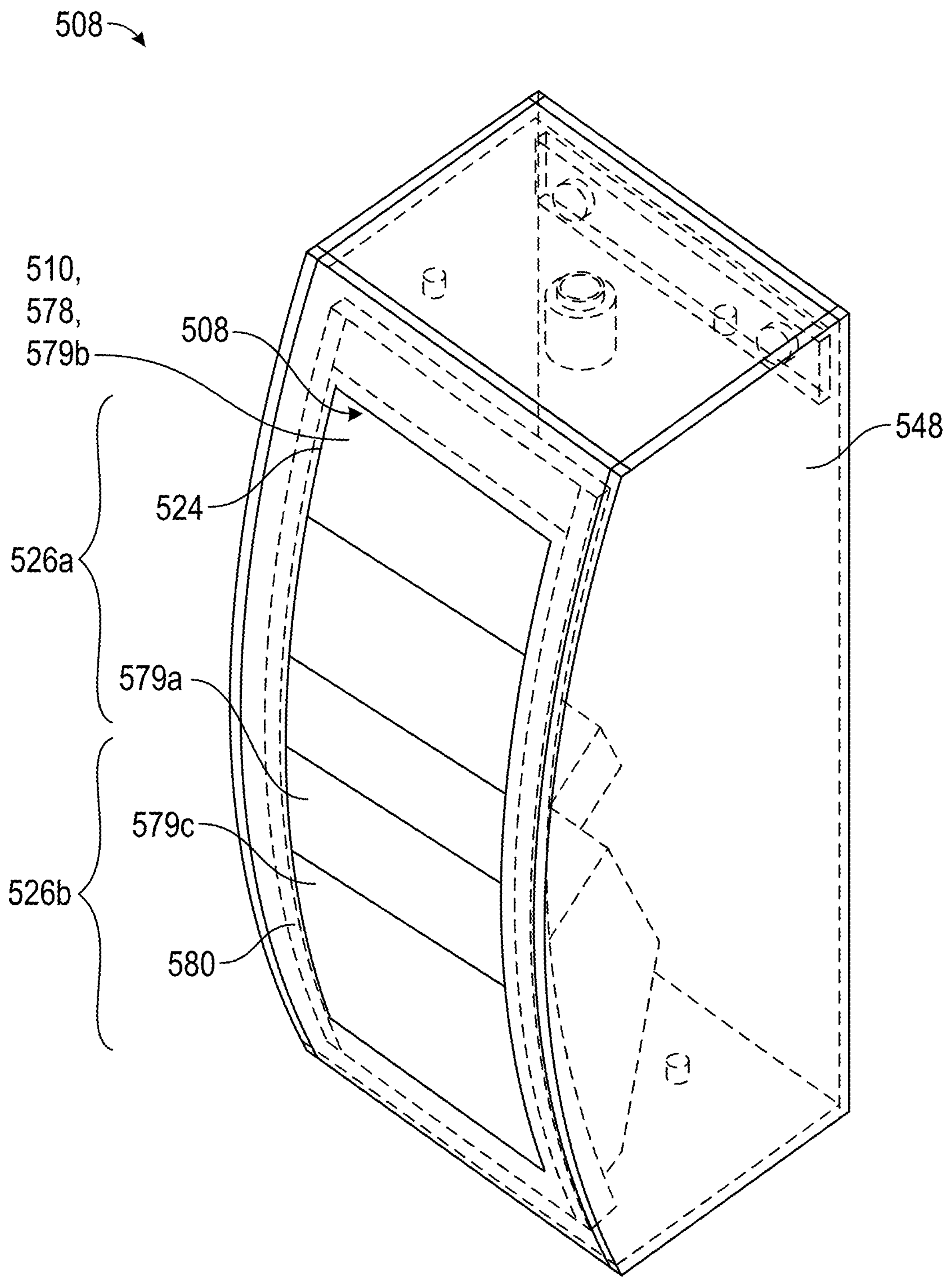
FIG. 12 depicts a perspective view of another implementation of the display module of FIG. 8, showing the display module having three split-flap displays arranged in a column.

FIG. 12 depicts another implementation of a display module 508 that is somewhat similar to the display module 408 of FIGS. 7-11. To avoid undue repetition, elements in the implementation of FIGS. 7-11 that are analogous to elements shown in FIG. 12 are called out with numbers that share the same last two digits as those analogous elements in FIG. 12. Thus, the discussion provided above with respect to the elements of the implementation of FIGS. 7-11 will be understood to be equally applicable to the analogous elements in FIG. 12 unless indicated otherwise. In the interest of conciseness, discussion of these elements that would be redundant of earlier discussion herein of similar elements is not provided, with the understanding that the earlier discussion of such elements is applicable to these similar elements in FIG. 12.

While the display module 408 of FIGS. 7-11 has the supplemental display 410 including the electronic display screen 412, the display module 508 of FIG. 12 has a supplemental display 510 including a transparent cover 480 removably coupled to the housing 548 and a first split-flap display 579*a* of a first set of one or more split-flap displays 578 removably coupled to the housing 548. Each of the split-flap displays 578 includes a plurality of flaps on which the one or more characters, graphics, or symbols are painted or silkscreened or otherwise displayed, and these flaps are rotated to a plurality of rotational positions to show a desired one or more characters, graphics, or symbols at each rotational position. The transparent cover 480 has a convex surface 524 with a second radius of curvature RC2 about a second center axis CA2. The transparent cover 480 is located, when the transparent cover 480 is supported by the arm 428 in the first position P1 (FIG. 6), relative to the main display 404 such that the first center axis CA1 corresponding with the first radius of curvature of the cylindrical surface 420 for the mechanical reels 416, the second center axis CA2 corresponding with the second radius of curvature RC2 of the convex surface 524 for the supplemental display 510, and the third center axis CA3 corresponding with the third radius of curvature RC3 of the curved edges 468 are disposed in a common plane. In one implementation, the second center axis CA2 corresponding with the convex surface 524 of the transparent cover 480 is positioned up to four inches along the horizontal direction (i.e., along the Z-axis extending between the front and back of the EGM) from the first center axis CA1 of cylindrical surface 420 of the mechanical reels 416 for the main display 404 and/or the third center axis CA3 of curved edges 468. Moreover, a ratio of the second radius of curvature RC2 for the convex surface 524 of the transparent cover 480 to the first radius of curvature RC1 for the cylindrical surface 420 of each of the mechanical reels 416 and/or the third radius of curvature RC3 for curved edges 468 may be within a range between 1:1 and 1.5:1. The above non-limiting example ranges of values for these example parameters or other suitable parameters of the transparent cover 480, the main display 404, and the curved edges 468, respectively, may provide a visual indication that game mechanics require the player to consider a combination of the graphical objects and/or data presented by the supplemental display 410 and the graphical objects and/or data presented by the main display 404. In other implementations, the transparent cover 480 may be an electronic display screen, such as a capacitive touchscreen including an input (e.g., a touch panel) and an output (e.g., a flexible LCD panel, a flexible plasma display panel, a flexible LED panel, a flexible OLED panel, a flexible AMOLED panel, etc.).

The first set of one or more split-flap displays 578 further includes a second split-flap display 579*b* and a third split-flap display 579*c*. The first split-flap display 579*a*, the second split-flap display 579*b*, and the third split-flap display 579*c* are arranged in a vertical column, with the first split-flap display 579*a* positioned between the second split-flap display 579*b* and the third split-flap display 579*c*. The first split-flap display 579*a*, the second split-flap display 579*b*, and the third split-flap display 579*c* are configured to collectively cycle through a plurality of consecutive states to display a plurality of symbol combinations arranged in a column for each of the consecutive states in order to represent a virtual spinning reel. The first split-flap display 579*a*, the second split-flap display 579*b*, and the third split-flap display 579*c* may have a common configuration of split-flaps with a common sequence of symbols. The one or more processors may cause the second split-flap display 579*b* to show a next symbol in the sequence compared to the symbol shown in the first split-flap display 579*a*, and further cause the third split-flap display 579*c* to show a previous symbol in the sequence compared to the symbol shown in the first split-flap display 579*a*. The first split-flap display 579*a* is configured to display one of the symbols at a first location along a first payline PL1 (FIG. 5) of the first set of one or more paylines 470 continued from the main display 404. The second split-flap display 579*b* is configured to display, for each of the consecutive states, one of the symbols at a second location along a second payline PL2 (FIG. 5) of the first set of one or more paylines. The third split-flap display 579*c* is configured to display, for each of the consecutive states, one of the symbols at a third location along a third payline PL3 (FIG. 5) of the first set of one or more paylines 570. The one or more processors 446 cause the first split-flap display 579*a* to display a predetermined symbol at the first location when the first set of one or more split-flap displays 578 collectively are in a first state. The one or more processors 446 cause the second split-flap display 579*b* to display the predetermined symbol at the second location when the first set of one or more split-flap displays 578 collectively are in a second state. The one or more processors 446 cause third split-flap display 579*c* to display the predetermined symbol at the third location when the first set of one or more split-flap displays 578 collectively are in a third state. In other implementations, first set of one or more split-flap displays 578 includes a single split-flap display having a rotational axis, and the single split-flap display may be positioned relative to the main display 404 such that the rotational axis is positioned up to one inch from one of the paylines presented in the main display 404.

In this implementation, each of the split-flap displays 578 includes a locking element 582 configured to hold that split-flap display 578 in a current state of the plurality of consecutive states, responsive to the one or more processors 446 not causing: the main display 404 to present the set of reels 414 with the combination of the symbols along the first set of one or more paylines 470; and/or the supplemental display 510 to present one or more symbols along the corresponding one or more paylines 470 continued from the main display 404.

Figure 13:
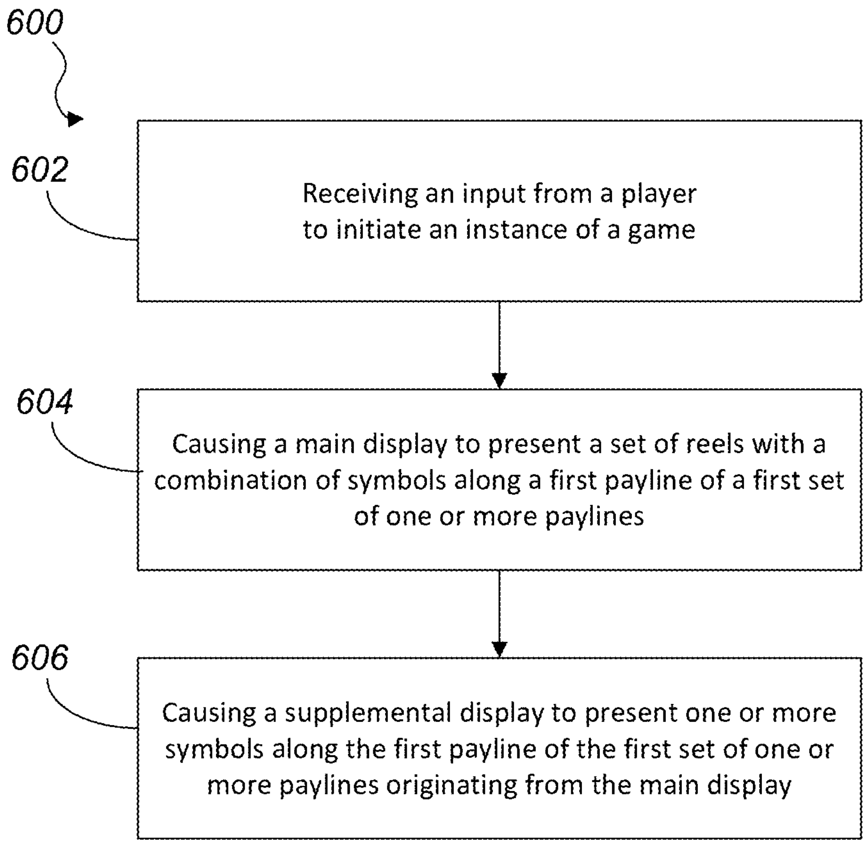
FIG. 13 depicts a flow chart of an example method of operating the EGM of FIG. 4.

Referring to FIG. 13, an example of a method 600 is provided for operating the EGM 400 of FIG. 4. The method 600 begins at block 602 with a player control receives an input from a player to initiate an instance of a game. In one implementation, the player holds the handle 466 and transmits a force to the lever apparatus to move the arm 428 from the first position P1 (FIG. 8) to the second position P2 (FIG. 8) or from the second position P2 to the first position P1, and the sensor 442 generates a signal responsive, at least in part, to the arm 428 moving from the first position to the second position. In another implementation, the player may provide the touch input to the capacitive touchscreen 450 via at least a tap input, a double tap input, a touch-and-hold input, a swipe input, a high-five input, and/or other touch inputs. In still another implementation, the player may provide a gesture (e.g., a hand wave, a fist-pump, etc.) captured by a camera 476 associated with a command to initiate an instance of a game. In other implementations, the player may state a vocal command (e.g., "Spin!" or "Go!" etc.) associated with a command to initiate an instance of a game. In other implementations, the cabinet 402 may include a button or other control interface labelled "Spin," and the player may press the button or otherwise operate the control interface to initiate game play. The method 600 then proceeds to block 604.

At block 604, the method 600 includes causing the one or more processors 446 to cause, responsive to the input (e.g., the arm 428 being moved from the first position P1 to the second position P2 or the touch input being received by the capacitive touchscreen 450), the main display 404 to present the set of reels 414 with a combination of the symbols along a first payline PL1 of a first set of one or more paylines 470. In one implementation where the set of reels 414 are mechanical reels 416, the method 600 may further include causing the one or more processors 446 to cause one or more motors 472 to spin the set of mechanical reels 416 about the first center axis CA1, responsive to the input. The method 600 then proceeds to block 604.

At block 606, the method 600 may further include causing the one or more processors 446 to cause, responsive to the input, the supplemental display 410 to present one or more symbols along the first payline PL1 of the first set of one or more paylines 470 continued from the main display 404. The method 600 may further include causing the one or more processors 446 to cause, responsive to the input, the center region 460 of the supplemental display 410 to present a first symbol of a set of one or more symbols along the first payline PL1 of the first set of one or more paylines 470. The method 600 may further include causing the one or more processors 446 to cause the elongated regions 462 of the supplemental display 410 to present a plurality of graphical objects representing a plurality of virtual LEDs 474.

It will be understood that the various GUI s and game mechanics discussed herein may be implemented entirely locally, e.g., by a processor or processors of a single device, such as a smartphone, or may be provided using processors located in different devices or systems. Information regarding the selection of symbols, awards associated with special symbols, etc., may be transmitted, e.g., via a network connection (wired, wireless, or a mixture of both) to another device, e.g., a smartphone, the processor or processors of which may then implement the GUI and/or feature game mechanic using the information regarding the symbols, awards, etc. Such information may be generated and/or sent in response to receipt of a request from such another device, e.g., a request from a smartphone for the server to provide such information. Such distributed-computing implementations of the GUI provisioning techniques discussed herein is to be understood to also be within the scope of this disclosure.

It will be appreciated that in such distributed computing arrangements, the computer-executable instructions for implementing the GUI may be distributed between different memory devices located in different devices, e.g., the computer-executable instructions for selecting symbols stored on one or more memory devices of a server, while the computer-executable instructions for presenting the GUI may be stored on one or more memory devices of a client gaming device, e.g., a smartphone.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.
b) The client device stores instructions for causing A, B, and C to occur, but the server stores no instructions that cause A, B, and C to occur.
c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.
d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.
e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.
b) The second set of one or more processors may be caused to perform each of A, B, and C, and the first set of one or more processors may not perform any of A, B, or C.
c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.
d) The first set of one or more processors may be caused to perform A and a portion of B, and the second set of one or more processors may be caused to perform C and the remainder of B.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine comprising:
a cabinet including a main display configured to present a set of reels each having a plurality of symbols, wherein the main display includes a first half portion and a second half portion disposed on opposing sides of a transverse plane;
a lever apparatus comprising:
an arm mounted to the cabinet and configured to move between a first position and a second position;
a display module including a housing removably coupled to the arm, the display module further including a supplemental display removably coupled to the housing, the supplemental display having a center, wherein the supplemental display is located, responsive to the supplemental display being supported by the arm in the first position, relative to the main display such that the center of the supplemental display is spaced up to one inch from the transverse plane of the main display;
one or more processors; and
one or more memory devices, the one or more memory devices storing computer-executable instructions which, when executed by the one or more processors, cause the one or more processors to:
cause, responsive to the arm being moved from the first position to the second position:
the main display to present the set of reels with a combination of the symbols along a first payline of a first set of one or more paylines, and
the supplemental display to present one or more symbols along the first payline of the first set of one or more paylines continued from the main display.

2. The electronic gaming machine of claim 1, wherein:
the set of reels each have a cylindrical surface with a first radius of curvature about a first center axis, wherein each of the reels is configured to rotate about the first center axis; and
the supplemental display comprises an electronic display screen having a convex surface with a second radius of curvature about a second center axis, wherein the supplemental display is located, responsive to the supplemental display being supported by the arm in the first position, relative to the main display such that the second center axis corresponding with the convex surface of the supplemental display is positioned up to one inch from the first center axis of the cylindrical surface of the reels for the main display.

3. The electronic gaming machine of claim 2, wherein a ratio of the second radius of curvature for the convex surface of the supplemental display to the first radius of curvature for the cylindrical surface of each of the reels is within a range between 1:1 and 1.5:1.

4. The electronic gaming machine of claim 2, wherein the cabinet has a pair of curved edges on opposite sides of the main display, and each of the curved edges has a third radius of curvature about a third center axis, wherein the supplemental display is located, responsive to the supplemental display being supported by the arm in the first position, relative to the pair of curved edges such that the center of the supplemental display is positioned up to one inch along a vertical direction from the third center axis corresponding with the curved edges of the cabinet.

5. The electronic gaming machine of claim 4, wherein a ratio of the third radius of curvature for the curved edges to the second radius of curvature for the convex surface of the supplemental display is within a range between 1:1 and 1.5:1.

6. The electronic gaming machine of claim 4, wherein the set of reels, the supplemental display of the lever apparatus, and the curved edges of the cabinet are positioned relative to one another, when the supplemental display is supported by the arm in the first position, such that the first center axis corresponding with the first radius of curvature of the cylindrical surface for the reels, the second center axis corresponding with the second radius of curvature of the convex surface for the supplemental display, and the third center axis corresponding with the third radius of curvature of the curved edges are disposed in a common plane.

7. The electronic gaming machine of claim 2, wherein the electronic display screen is a capacitive touchscreen, and the one or more memory devices store additional computer-executable instructions which, when executed by the one or more processors, cause the one or more processors to cause one or more motors to spin the set of reels about the first center axis, responsive to a touch input received by the capacitive touchscreen.

8. The electronic gaming machine of claim 2, wherein:

the housing includes a center opening and a pair of slits disposed on opposite sides of the opening;

the supplemental display includes a center region and a pair of elongated regions disposed on opposite sides of the center region;

direct lines-of-sight exist from the center region of the supplemental display and through the center opening to one or more viewpoints external to the housing;

direct lines-of-sight exist from the pair of elongated regions of the supplemental display and through the corresponding pair of slits to one or more viewpoints external to the housing; and the housing further includes a pair of elongated mask portions, each elongated mask portion separating the center opening from a corresponding one of the slits, made of opaque material, and configured to mask a corresponding one of a pair of portions of the supplemental display in between the center region of the supplemental display and the elongated regions of the supplemental display.

9. The electronic gaming machine of claim 8, wherein the one or more memory devices store additional computer-executable instructions which, when executed by the one or more processors, cause the one or more processors to:

cause the center region of the supplemental display to present a first symbol of a set of one or more symbols along the first payline of the first set of one or more paylines; and cause the elongated regions of the supplemental display to present a plurality of graphical objects representing a plurality of LEDs.

10. The electronic gaming machine of claim 9, wherein the main display further comprises a plurality of physical LEDs arranged proximate to a pair of edges of the cylindrical surfaces.

11. The electronic gaming machine of claim 1, wherein the one or more processors determines whether the symbols displayed along the first payline, including the symbols displayed from the set of reels that are along the first payline and the one or more symbols on the supplemental display that are along the first payline, form a winning pattern.

12. The electronic gaming machine of claim 1, wherein:

the set of reels comprises a set of mechanical reels each having a cylindrical surface with a first radius of curvature about a first center axis, wherein each of the mechanical reels is configured to rotate about a first center axis;

the supplemental display includes a transparent cover mounted to the housing and having a convex surface with a second radius of curvature about a second center axis, wherein the transparent cover is located, responsive to the supplemental display being supported by the arm in the first position, relative to the main display such that the second center axis is positioned up to one inch from the first center axis; and the supplemental display comprises a first split-flap display of a first set of one or more split-flap displays configured to display one of the symbols at a first location along a first payline of the first set of one or more paylines continued from the main display.

13. The electronic gaming machine of claim 12, wherein:

the first set of one or more split-flap displays further includes a second split-flap display and a third split-flap display, wherein the first split-flap display, the second split-flap display, and the third split-flap display are arranged in a vertical column, with the first split-flap display positioned between the second split-flap display and the third split-flap display, and wherein the first split-flap display, the second split-flap display, and the third split-flap display are configured to collectively cycle through a plurality of consecutive states to display a plurality of symbol combinations for each of the consecutive states;

the first split-flap display is configured to display, for each of the consecutive states, one of the symbols at the first location along the first payline of the first set of one or more paylines;

the second split-flap display is configured to display, for each of the consecutive states, one of the symbols at a second location along a second payline of the first set of one or more paylines;

the third split-flap display is configured to display, for each of the consecutive states, one of the symbols at a third location along a third payline of the first set of one or more paylines; and the one or more memory devices store additional computer-executable instructions which, when executed by the one or more processors, cause the one or more processors to cause:

the first split-flap display to display a predetermined symbol at the first location when the first set of one or more split-flap displays collectively are in a first state;

the second split-flap display to display the predetermined symbol at the second location when the first set of one or more split-flap displays collectively are in a second state; and the third split-flap display to display the predetermined symbol at the third location when the first set of one or more split-flap displays collectively are in a third state.

14. The electronic gaming machine of claim 13, wherein the first split-flap display, the second split-flap display, and the third split-flap display have a common configuration of split flaps with a common sequence of symbols, wherein the one or more processors:

cause the second split-flap display to show a next symbol in the sequence compared to the symbol shown in the first split-flap display, and cause the third split-flap display to show a previous symbol in the sequence compared to the symbol shown in the first split-flap display.

15. One or more non-transitory computer-readable media storing computer-executable instructions which, when executed by one or more processors, cause the one or more processors to:

cause, responsive to an arm of a lever apparatus being moved from a first position to a second position, wherein the arm is mounted to a cabinet of an electronic gaming machine, and wherein the lever apparatus comprises a display module including a housing removably coupled to the arm, and wherein the display module further includes a supplemental display:

a main display in the cabinet to present a set of reels with a combination of symbols along a first payline of a first set of one or more paylines, and the supplemental display to present one or more symbols along the first payline of the first set of one or more paylines continued from the main display.

16. The one or more non-transitory computer-readable media of claim 15 wherein one or more non-transitory computer-readable media store additional computer-executable instructions which, when executed by one or more processors, cause the one or more processors to:

cause one or more motors to rotate a set of mechanical reels in the main display about a first center axis, responsive to a touch input being received by a capacitive touchscreen of the supplemental display for the display module of the lever apparatus or responsive to the arm of the lever apparatus being moved from the first position to the second position relative to the cabinet of the electronic gaming machine.

17. The one or more non-transitory computer-readable media of claim 16 wherein the one or more non-transitory computer-readable media store additional computer-executable instructions which, when executed by one or more processors, cause the one or more processors to:

cause, responsive to the touch input being received by the capacitive touchscreen or responsive to the arm being moved from the first position to the second position, a center region of the supplemental display to present a first symbol of a set of one or more symbols along the first payline of the first set of one or more paylines; and cause a pair of elongated regions of the supplemental display to present a plurality of graphical objects representing a plurality of LEDs.

18. A method for operating an electronic gaming machine having a main display, a lever apparatus with a supplemental display, and one or more non-transitory computer readable storage media, with the one or more non-transitory computer readable storage media having one or more processors and one or more memory devices, the one or more memory devices storing computer-executable instructions, the method comprising:

causing, responsive to an arm of the lever apparatus being moved from a first position to a second position, a main display in a cabinet to present a set of reels with a combination of symbols along a first payline of a first set of one or more paylines;

causing, responsive to the arm being moved from the first position to the second position, the supplemental display to present one or more symbols along the first payline of the first set of one or more paylines continued from the main display;

causing a center region of the supplemental display to present a first symbol of a set of one or more symbols along the first payline of the first set of one or more paylines; and causing a pair of elongated regions of the supplemental display to present a plurality of graphical objects representing a plurality of LEDs.

19. The method of claim 18 further comprising:

causing one or more motors to rotate a set of mechanical reels in the main display about a first center axis, responsive to a touch input received by a capacitive touchscreen of the supplemental display for a display module of the lever apparatus.

* * * * *